United States Patent
Campbell et al.

(10) Patent No.: US 10,401,481 B2
(45) Date of Patent: Sep. 3, 2019

(54) NON-UNIFORM BEAM POWER DISTRIBUTION FOR A LASER OPERATING IN A VEHICLE

(71) Applicant: LUMINAR TECHNOLOGIES, INC., Orlando, FL (US)

(72) Inventors: Scott R. Campbell, Sanford, FL (US); Matthew D. Weed, Winter Park, FL (US); Lane A. Martin, Sunnyvale, CA (US); Jason M. Eichenholz, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 15/941,677

(22) Filed: Mar. 30, 2018

(65) Prior Publication Data

US 2018/0284237 A1 Oct. 4, 2018

Related U.S. Application Data

(60) Provisional application No. 62/479,132, filed on Mar. 30, 2017.

(51) Int. Cl.
| | |
|---|---|
| *G01S 7/48* | (2006.01) |
| *G01S 7/481* | (2006.01) |
| *G01S 7/486* | (2006.01) |
| *G01S 17/42* | (2006.01) |
| *G01S 17/93* | (2006.01) |
| *G01S 7/484* | (2006.01) |

(52) U.S. Cl.
CPC ............ *G01S 7/4817* (2013.01); *G01S 7/484* (2013.01); *G01S 7/4815* (2013.01); *G01S 7/4861* (2013.01); *G01S 17/42* (2013.01); *G01S 17/936* (2013.01)

(58) Field of Classification Search
CPC ...... G01S 17/66; G01S 7/4802; G01S 17/936; G01S 17/10; G01S 17/42; G01C 3/08; G02B 5/08
See application file for complete search history.

(56) References Cited

U.S. PATENT DOCUMENTS

| | | |
|---|---|---|
| 5,006,721 A | 4/1991 | Cameron et al. |
| 6,449,384 B2 | 9/2002 | Laumeyer et al. |
| 6,710,324 B2 | 3/2004 | Hipp |
| 6,723,975 B2 | 4/2004 | Saccomanno |
| 6,747,747 B2 | 6/2004 | Hipp |
| 6,759,649 B2 | 7/2004 | Hipp |
| 7,092,548 B2 | 8/2006 | Laumeyer et al. |
| 7,209,221 B2 | 4/2007 | Breed et al. |
| 7,345,271 B2 | 3/2008 | Boehlau et al. |

(Continued)

*Primary Examiner* — Luke D Ratcliffe

(57) ABSTRACT

A lidar system includes a light source configured to emit light, a scanner configured to scan a field of regard of the lidar system using (i) a first output beam that includes at least a portion of the emitted light and has a first amount of power and (ii) a second output beam that includes at least a portion of the emitted light and has a second amount of power different from the first amount of power, with an angular separation between the first output beam and the second output beam along a vertical dimension of the field of regard, and a receiver configured to detect light associated with the first output beam and light associated with the second output beam scattered by one or more remote targets.

28 Claims, 14 Drawing Sheets

(56) References Cited

U.S. PATENT DOCUMENTS

| | | |
|---|---|---|
| 7,443,903 B2 | 10/2008 | Leonardo et al. |
| 7,532,311 B2 | 5/2009 | Henderson et al. |
| 7,570,793 B2 | 8/2009 | Lages et al. |
| 7,583,364 B1 | 9/2009 | Mayor et al. |
| 7,649,920 B2 | 1/2010 | Welford |
| 7,652,752 B2 | 1/2010 | Fetzer et al. |
| 7,872,794 B1 | 1/2011 | Minelly et al. |
| 7,902,570 B2 | 3/2011 | Itzler et al. |
| 7,945,408 B2 | 5/2011 | Dimsdale et al. |
| 7,969,558 B2 | 6/2011 | Hall |
| 7,995,796 B2 | 8/2011 | Retterath et al. |
| 8,059,263 B2 | 11/2011 | Haberer et al. |
| 8,072,663 B2 | 12/2011 | O'Neill et al. |
| 8,081,301 B2 | 12/2011 | Stann et al. |
| 8,138,849 B2 | 3/2012 | West et al. |
| 8,279,420 B2 | 10/2012 | Ludwig et al. |
| 8,280,623 B2 | 10/2012 | Trepagnier et al. |
| 8,346,480 B2 | 1/2013 | Trepagnier et al. |
| 8,364,334 B2 | 1/2013 | Au et al. |
| 8,452,561 B2 | 5/2013 | Dimsdale et al. |
| 8,548,014 B2 | 10/2013 | Fermann et al. |
| 8,625,080 B2 | 1/2014 | Heizmann et al. |
| 8,675,181 B2 | 3/2014 | Hall |
| 8,723,955 B2 | 5/2014 | Kiehn et al. |
| 8,767,190 B2 | 7/2014 | Hall |
| 8,796,605 B2 | 8/2014 | Mordarski et al. |
| 8,836,922 B1 | 9/2014 | Pennecot et al. |
| 8,880,296 B2 | 11/2014 | Breed |
| 8,896,818 B2 | 11/2014 | Walsh et al. |
| 8,934,509 B2 | 1/2015 | Savage-Leuchs et al. |
| 9,000,347 B2 | 4/2015 | Woodward et al. |
| 9,041,136 B2 | 5/2015 | Chia |
| 9,048,370 B1 | 6/2015 | Urmson et al. |
| 9,063,549 B1 | 6/2015 | Pennecot et al. |
| 9,069,060 B1 | 6/2015 | Zbrozek et al. |
| 9,074,878 B2 | 7/2015 | Steffey et al. |
| 9,086,273 B1 | 7/2015 | Gruver et al. |
| 9,086,481 B1 | 7/2015 | Dowdall et al. |
| 9,091,754 B2 | 7/2015 | d'Aligny |
| 9,103,669 B2 | 8/2015 | Giacotto et al. |
| 9,121,703 B1 | 9/2015 | Droz et al. |
| 9,160,140 B2 | 10/2015 | Gusev et al. |
| 9,170,333 B2 | 10/2015 | Mheen et al. |
| 9,199,641 B2 | 12/2015 | Ferguson et al. |
| 9,213,085 B2 | 12/2015 | Kanter |
| 9,239,260 B2 | 1/2016 | Bayha et al. |
| 9,246,041 B1 | 1/2016 | Clausen et al. |
| 9,285,464 B2 | 3/2016 | Pennecot et al. |
| 9,285,477 B1 | 3/2016 | Smith et al. |
| 9,297,901 B2 | 3/2016 | Bayha et al. |
| 9,299,731 B1 | 3/2016 | Lenius et al. |
| 9,304,154 B1 | 4/2016 | Droz et al. |
| 9,304,203 B1 | 4/2016 | Droz et al. |
| 9,304,316 B2 | 4/2016 | Weiss et al. |
| 9,310,471 B2 | 4/2016 | Sayyah et al. |
| 9,335,255 B2 | 5/2016 | Retterath et al. |
| 9,360,554 B2 | 6/2016 | Retterath et al. |
| 9,368,933 B1 | 6/2016 | Nijjar et al. |
| 9,383,201 B2 | 7/2016 | Jachman et al. |
| 9,383,445 B2 | 7/2016 | Lu et al. |
| 9,383,753 B1 | 7/2016 | Templeton et al. |
| 2006/0290920 A1 | 12/2006 | Kampchen et al. |
| 2009/0273770 A1 | 11/2009 | Bauhahn et al. |
| 2010/0034221 A1 | 2/2010 | Dragic |
| 2012/0227263 A1 | 9/2012 | Leclair et al. |
| 2013/0033742 A1 | 2/2013 | Rogers et al. |
| 2014/0111805 A1 | 4/2014 | Albert et al. |
| 2014/0168631 A1 | 6/2014 | Haslim et al. |
| 2014/0176933 A1 | 6/2014 | Haslim et al. |
| 2014/0211194 A1 | 7/2014 | Pacala et al. |
| 2014/0293263 A1 | 10/2014 | Justice et al. |
| 2014/0293266 A1 | 10/2014 | Hsu et al. |
| 2015/0131080 A1 | 5/2015 | Retterath et al. |
| 2015/0177368 A1 | 6/2015 | Bayha et al. |
| 2015/0185244 A1 | 7/2015 | Inoue et al. |
| 2015/0185313 A1* | 7/2015 | Zhu ............... G01S 17/08 356/5.01 |
| 2015/0192676 A1 | 7/2015 | Kotelnikov et al. |
| 2015/0192677 A1 | 7/2015 | Yu et al. |
| 2015/0204978 A1 | 7/2015 | Hammes et al. |
| 2015/0214690 A1 | 7/2015 | Savage-Leuchs et al. |
| 2015/0301182 A1 | 10/2015 | Geiger et al. |
| 2015/0323654 A1 | 11/2015 | Jachmann et al. |
| 2015/0378023 A1 | 12/2015 | Royo Royo et al. |
| 2015/0378241 A1 | 12/2015 | Eldada |
| 2016/0025842 A1 | 1/2016 | Anderson et al. |
| 2016/0047901 A1 | 2/2016 | Pacala et al. |
| 2016/0049765 A1 | 2/2016 | Eldada |
| 2016/0146939 A1 | 5/2016 | Shpunt et al. |
| 2016/0146940 A1 | 5/2016 | Koehler |
| 2016/0161600 A1 | 6/2016 | Eldada et al. |
| 2016/0245919 A1 | 8/2016 | Kalscheur et al. |
| 2018/0032042 A1 | 2/2018 | Turpin et al. |
| 2018/0113216 A1* | 4/2018 | Kremer ............ G01S 17/89 |

\* cited by examiner

NON-UNIFORM BEAM POWER DISTRIBUTION FOR A LASER OPERATING IN A VEHICLE

CROSS-REFERENCE TO RELATED APPLICATIONS

This application claims priority to provisional U.S. Application Ser. No. 62/479,132, filed on Mar. 30, 2017, entitled "Non-Uniform Beam Pattern Distribution for a Laser Operating in a Vehicle," the entire disclosure of which is hereby expressly incorporated by reference herein.

FIELD OF TECHNOLOGY

This disclosure generally relates to lidar systems and, more particularly, to the power levels of output beams of light generated in such systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Light detection and ranging (lidar) is a technology that can be used to measure distances to remote targets. Typically, a lidar system includes a light source and an optical receiver. The light source can be, for example, a laser which emits light having a particular operating wavelength. The operating wavelength of a lidar system may lie, for example, in the infrared, visible, or ultraviolet portions of the electromagnetic spectrum. The light source emits light toward a target which then scatters the light. Some of the scattered light is received back at the receiver. The system determines the distance to the target based on one or more characteristics associated with the returned light. For example, the system may determine the distance to the target based on the time of flight of a returned light pulse.

SUMMARY

In one embodiment, a lidar system comprises a light source configured to emit light; a scanner configured to scan a field of regard of the lidar system using (i) a first output beam that includes at least a portion of the emitted light and has a first amount of power and (ii) a second output beam that includes at least a portion of the emitted light and has a second amount of power different from the first amount of power, with an angular separation between the first output beam and the second output beam along a vertical dimension of the field of regard; and a receiver configured to detect light associated with the first output beam and light associated with the second beam scattered by one or more remote targets.

In another embodiment, a method in a lidar system operating in a vehicle for scanning a field of regard is provided. The method comprises generating a first output beam of light has a first amount of power; generating a second output beam of light has a second amount of power smaller than the first amount of power; scanning the field of regard using the first output beam and the second output beam, including directing the first output beam in a direction substantially parallel to a plane of motion of the vehicle, and directing the second output beam in a direction non-parallel to the plane of motion of the vehicle; and detecting light associated with the first output beam and light associated with the second beam scattered by one or more remote targets.

In another embodiment, a lidar system operating in a transport moving on a plane of motion. The lidar system comprises a light source configured to emit light, a scanner configured to direct the light along a scan direction to illuminate respective regions within a field of regard of the light source, and a diffractive optical element configured to split the light into multiple output beams with non-equal power, angularly separated along a vertical dimension, so that a first output beam with larger power is directed in a direction substantially parallel to the plane of motion of the transport, and a second output beam with smaller power is directed in a direction non-parallel to the plane of motion of the transport. The lidar system further comprises a receiver configured to detect the pulses of light scattered by remote targets. The receiver can include a first detector to detect the first output beam and a second detector to detect the second output beam.

DETAILED DESCRIPTION

Overview

Figure 1A:
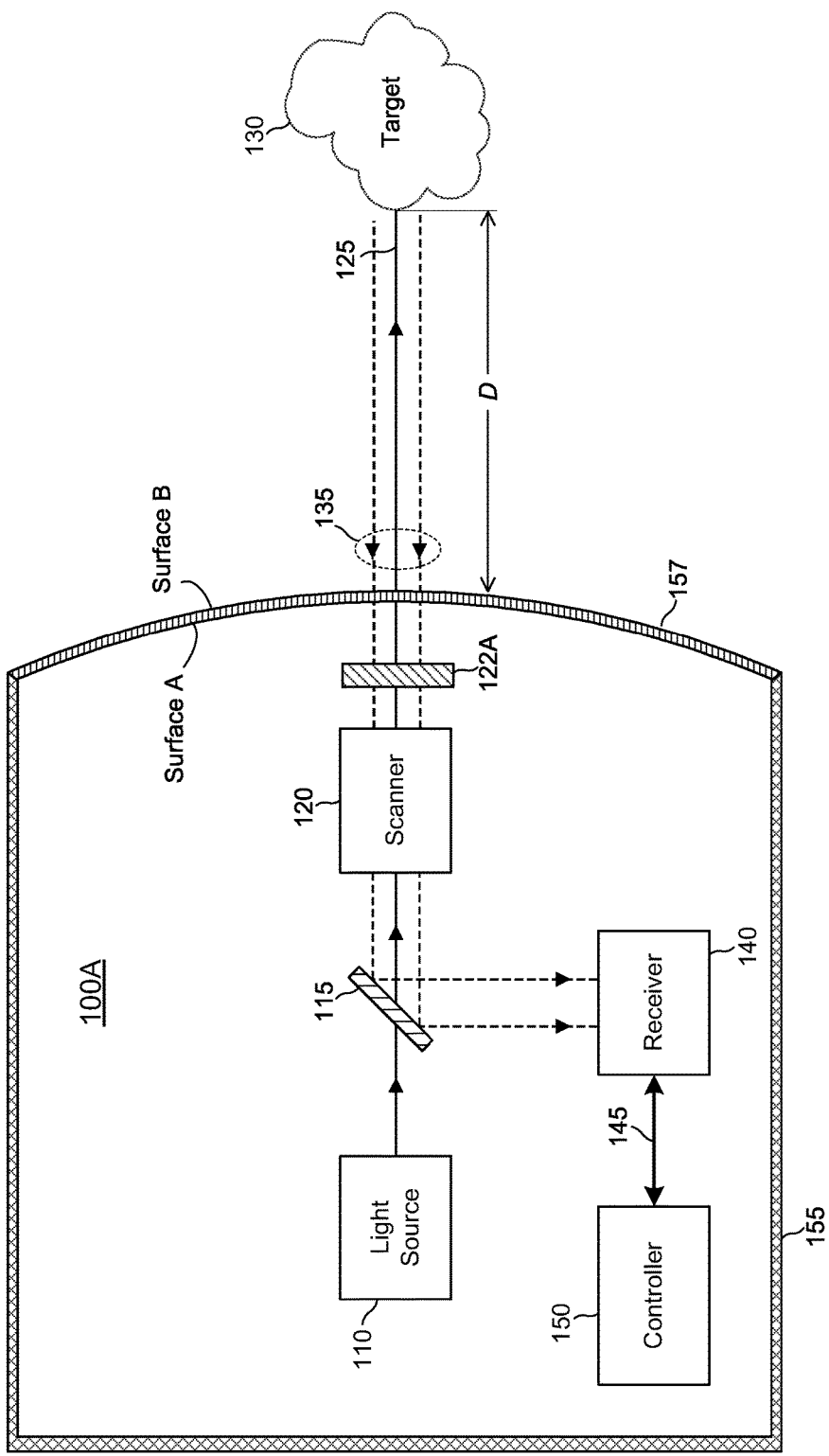
FIG. 1A is a block diagram of an example light detection and ranging (lidar) system in which an optical element (OE) disposed downrange of the scanner provides non-uniform distribution of power across the field of regard.

A lidar system is configured to vary the power of one or more output beams of light in accordance with the orientation of the one or more output beams of light relative to the field of regard (FOR) of the lidar system. The FOR has a certain angular range in the horizontal dimension and a certain angular range in the vertical dimension to define a two-dimensional region.

In some implementations, the lidar system dynamically varies the power of an output beam in accordance with the current orientation of the output beam. For example, if the lidar system scans a first scan line with an output beam, and then scans another scan line above or below the first scan line with the same output beam, the lidar system can increase the power of the output beam as the output beam approaches the centerline of the FOR, and decrease the power of the output beam as the output beam approaches the upper or the lower edge of the FOR.

In addition to varying the power of an output beam in view of the distance to the upper and lower edges of the FOR, the lidar system also can vary the power of the output beam further in view of the distance to the left and right edges of the FOR. The output power in this case may be largest when the output beam is oriented toward the center of the FOR and lowest when the output beam is oriented toward one of the corners of the FOR. More generally, the lidar system can dynamically vary the power of an output beam depending on the azimuth of the output beam, the altitude of the beam, or both.

To implement dynamic orientation-dependent power distribution, the lidar system can receive a signal indicative of the current position of one or more mirrors (e.g., from a galvanometer scanner that imparts rotation to an oscillating planar scan mirror, from a motor that imparts rotation to a polygon mirror), and electronically control the output of a laser and/or an amplification component corresponding to the laser.

In another implementation, the lidar system utilizes an optical element (OE) that, for different angles of incident light, transmits, reflects, refracts and/or diffracts a different amount of power. The OE can be designed and positioned within the lidar system so that an output beam oriented toward a point closer to the centerline of the FOR retains more power than an output beam oriented toward a point closer to the lower or upper edge of the FOR. The OE can be placed downrange of the scanner, for example. In other implementations, the OE can be placed between a light source and a first (e.g., polygon) mirror of a scanner along the path of outbound light, or between the first and the second (e.g., planar) mirror of the scanner along the path of outbound light.

In yet another implementation of dynamic power distribution, the lidar system can electronically control an OE to vary the amount of power directed toward a point within the FOR in accordance with the current orientation of the output beam relative to the FOR.

In other implementations, different output beams of the lidar system have different fixed orientation (elevation and azimuth) relative to the FOR and accordingly scan different scan lines within the FOR. In one such case, the lidar system includes multiple laser sources, operating at the same wavelength or different wavelengths, that are mechanically aimed at different scan lines or bands of scan lines within the FOR. In another case, a light source directs a monochromatic output beam toward an OE that splits the output beam into several output beams and imparts different angles as well as different power levels to these output beams. In still other implementations, a lidar system generates several output beams having different wavelengths, and an OE is configured to direct a different amount of power for different wavelengths. The OE can be configured to direct the desired amount of power for different wavelengths if the output beam has substantially the same amount of power at these different wavelengths or different amounts of power at different wavelengths.

Certain implementations of a lidar system include a single detector configured to detect light scattered by remote targets and corresponding to output beams having different power levels. When the lidar system implements dynamic power distribution, a controller can adjust the gain of the detector in accordance with the orientation of the output beam relative to the field of regard.

Other implementations of the lidar system include multiple detectors corresponding to different output beams concurrently scanning respective pixels. For example, a lidar system can concurrently scan N pixels within the field of regard using N output beams of two or more different power levels, and utilize N detectors corresponding to these N output beams.

Example Lidar Systems in which Non-Uniform Power Distribution can be Implemented FIG. 1A illustrates an example light detection and ranging (lidar) system 100A. The lidar system 100A may be referred to as a laser ranging system, a laser radar system, a LIDAR system, a lidar sensor, or a laser detection and ranging (LADAR or ladar) system. The lidar system 100A may include a light source 110, a mirror 115, a scanner 120, a receiver 140, and a controller 150. The light source 110 may be, for example, a laser which emits light having a particular operating wavelength in the infrared, visible, or ultraviolet portions of the electromagnetic spectrum. As a more specific example, the light source 110 may include a laser with an operating wavelength between approximately 1.2 µm and 1.7 µm.

In operation, the light source 110 emits an output beam of light 125 which may be continuous-wave, pulsed, or modulated in any suitable manner for a given application. The output beam of light 125 is directed downrange toward a remote target 130 located a distance D from the lidar system 100A and at least partially contained within a field of regard of the system 100A. Depending on the scenario and/or the implementation of the lidar system 100A, D can be between 1 m and 1 km, for example.

Once the output beam 125 reaches the downrange target 130, the target 130 may scatter or, in some cases, reflect at least a portion of light from the output beam 125, and some of the scattered or reflected light may return toward the lidar system 100A. In the example of FIG. 1, the scattered or reflected light is represented by input beam 135, which passes through the scanner 120, which may be referred to as a beam scanner, optical scanner, or laser scanner. The input beam 135 passes through the scanner 120 to the mirror 115, which may be referred to as an overlap mirror, superposition mirror, or beam-combiner mirror. The mirror 115 in turn directs the input beam 135 to the receiver 140. The input 135 may contain only a relatively small fraction of the light from the output beam 125. For example, the ratio of average power, peak power, or pulse energy of the input beam 135 to average power, peak power, or pulse energy of the output beam 125 may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of the output beam 125 has a pulse energy of 1 microjoule ($\mu$J), then the pulse energy of a corresponding pulse of the input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, or 1 aJ.

The output beam 125 may be referred to as a laser beam, light beam, optical beam, emitted beam, or just beam; and the input beam 135 may be referred to as a return beam, received beam, return light, received light, input light, scattered light, or reflected light. As used herein, scattered light may refer to light that is scattered or reflected by the target 130. The input beam 135 may include light from the output beam 125 that is scattered by the target 130, light from the output beam 125 that is reflected by the target 130, or a combination of scattered and reflected light from target 130.

The operating wavelength of a lidar system 100A may lie, for example, in the infrared, visible, or ultraviolet portions of the electromagnetic spectrum. The Sun also produces light in these wavelength ranges, and thus sunlight can act as background noise which can obscure signal light detected by the lidar system 100A. This solar background noise can result in false-positive detections or can otherwise corrupt measurements of the lidar system 100A, especially when the receiver 140 includes SPAD detectors (which can be highly sensitive).

Generally speaking, the light from the Sun that passes through the Earth's atmosphere and reaches a terrestrial-based lidar system such as the system 100A can establish an optical background noise floor for this system. Thus, in order for a signal from the lidar system 100A to be detectable, the signal must rise above the background noise floor. It is generally possible to increase the signal-to-noise (SNR) ratio of the lidar system 100A by raising the power level of the output beam 125, but in some situations it may be desirable to keep the power level of the output beam 125 relatively low. For example, increasing transmit power levels of the output beam 125 can result in the lidar system 100A not being eye-safe.

In some implementations, the lidar system 100A operates at one or more wavelengths between approximately 1400 nm and approximately 1600 nm. For example, the light source 110 may produce light at approximately 1550 nm.

In some implementations, the lidar system 100A operates at frequencies at which atmospheric absorption is relatively low. For example, the lidar system 100A can operate at wavelengths in the approximate ranges from 980 nm to 1110 nm or from 1165 nm to 1400 nm.

In other implementations, the lidar system 100A operates at frequencies at which atmospheric absorption is high. For example, the lidar system 100A can operate at wavelengths in the approximate ranges from 930 nm to 980 nm, from 1100 nm to 1165 nm, or from 1400 nm to 1460 nm.

According to some implementations, the lidar system 100A can include an eye-safe laser, or the lidar system 100A can be classified as an eye-safe laser system or laser product. An eye-safe laser, laser system, or laser product may refer to a system with an emission wavelength, average power, peak power, peak intensity, pulse energy, beam size, beam divergence, exposure time, or scanned output beam such that emitted light from the system presents little or no possibility of causing damage to a person's eyes. For example, the light source 110 or lidar system 100A may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In some implementations, the lidar system 100A may be classified as an eye-safe laser product (e.g., with a Class 1 or Class I classification) configured to operate at any suitable wavelength between approximately 1400 nm and approximately 2100 nm. In some implementations, the light source 110 may include a laser with an operating wavelength between approximately 1400 nm and approximately 1600 nm, and the lidar system 100A may be operated in an eye-safe manner. In some implementations, the light source 110 or the lidar system 100A may be an eye-safe laser product that includes a scanned laser with an operating wavelength between approximately 1530 nm and approximately 1560 nm. In some implementations, the lidar system 100A may be a Class 1 or Class I laser product that includes a fiber laser or solid-state laser with an operating wavelength between approximately 1400 nm and approximately 1600 nm.

The receiver 140 may receive or detect photons from the input beam 135 and generate one or more representative signals. For example, the receiver 140 may generate an output electrical signal 145 that is representative of the input beam 135. The receiver may send the electrical signal 145 to the controller 150. Depending on the implementation, the controller 150 may include one or more processors, an application-specific integrated circuit (ASIC), a field-programmable gate array (FPGA), and/or other suitable circuitry configured to analyze one or more characteristics of the electrical signal 145 to determine one or more characteristics of the target 130, such as its distance downrange from the lidar system 100A. More particularly, the controller 150 may analyze the time of flight or phase modulation for the beam of light 125 transmitted by the light source 110. If the lidar system 100A measures a time of flight of T (e.g., T represents a round-trip time of flight for an emitted pulse of light to travel from the lidar system 100A to the target 130 and back to the lidar system 100A), then the distance D from the target 130 to the lidar system 100A may be expressed as $D=c \cdot T/2$, where c is the speed of light (approximately $3.0 \times 10^8$ m/s).

As a more specific example, if the lidar system 100A measures the time of flight to be T=300 ns, then the lidar system 100A can determine the distance from the target 130 to the lidar system 100A to be approximately D=45.0 m. As another example, the lidar system 100A measures the time of flight to be T=1.33 μs and accordingly determines that the distance from the target 130 to the lidar system 100A is approximately D=199.5 m. The distance D from lidar system 100A to the target 130 may be referred to as a distance, depth, or range of the target 130. As used herein, the speed of light c refers to the speed of light in any suitable medium, such as for example in air, water, or vacuum. The speed of light in vacuum is approximately $2.9979 \times 10^8$ m/s, and the speed of light in air (which has a refractive index of approximately 1.0003) is approximately $2.9970 \times 10^8$ m/s.

The target 130 may be located a distance D from the lidar system 100A that is less than or equal to a maximum range $R_{MAX}$ of the lidar system 100A. The maximum range $R_{MAX}$ (which also may be referred to as a maximum distance) of a lidar system 100A may correspond to the maximum distance over which the lidar system 100A is configured to sense or identify targets that appear in a field of regard of the lidar system 100A. The maximum range of lidar system 100A may be any suitable distance, such as for example, 25 m, 50 m, 100 m, 200 m, 500 m, or 1 km. As a specific example, a lidar system with a 200-m maximum range may be configured to sense or identify various targets located up to 200 m away. For a lidar system with a 200-m maximum range ($R_{MAX}$=200 m), the time of flight corresponding to the maximum range is approximately $2 \cdot R_{MAX}/c \approx 1.33$ μs.

In some implementations, the light source 110, the scanner 120, and the receiver 140 may be packaged together within a single housing 155, which may be a box, case, or enclosure that holds or contains all or part of a lidar system 100A. The housing 155 includes a window 157 through which the beams 125 and 135 pass. In one example implementation, the lidar-system housing 155 contains the light source 110, the overlap mirror 115, the scanner 120, and the receiver 140 of a lidar system 100A. The controller 150 may reside within the same housing 155 as the components 110, 120, and 140, or the controller 150 may reside remotely from the housing.

Moreover, in some implementations, the housing 155 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, depending on the implementation.

The housing 155 may be an airtight or watertight structure that prevents water vapor, liquid water, dirt, dust, or other contaminants from getting inside the housing 155. The housing 155 may be filled with a dry or inert gas, such as for example dry air, nitrogen, or argon. The housing 155 may include one or more electrical connections for conveying electrical power or electrical signals to and/or from the housing.

The window 157 may be made from any suitable substrate material, such as for example, glass or plastic (e.g., polycarbonate, acrylic, cyclic-olefin polymer, or cyclic-olefin copolymer). The window 157 may include an interior surface (surface A) and an exterior surface (surface B), and surface A or surface B may include a dielectric coating having particular reflectivity values at particular wavelengths. A dielectric coating (which may be referred to as a thin-film coating, interference coating, or coating) may include one or more thin-film layers of dielectric materials (e.g., $SiO_2$, $TiO_2$, $Al_2O_3$, $Ta_2O_5$, $MgF_2$, $LaF_3$, or $AlF_3$) having particular thicknesses (e.g., thickness less than 1 μm) and particular refractive indices. A dielectric coating may be deposited onto surface A or surface B of the window 157 using any suitable deposition technique, such as for example, sputtering or electron-beam deposition.

The dielectric coating may have a high reflectivity at a particular wavelength or a low reflectivity at a particular wavelength. A high-reflectivity (HR) dielectric coating may have any suitable reflectivity value (e.g., a reflectivity greater than or equal to 80%, 90%, 95%, or 99%) at any suitable wavelength or combination of wavelengths. A low-reflectivity dielectric coating (which may be referred to as an anti-reflection (AR) coating) may have any suitable reflectivity value (e.g., a reflectivity less than or equal to 5%, 2%, 1%, 0.5%, or 0.2%) at any suitable wavelength or combination of wavelengths. In particular embodiments, a dielectric coating may be a dichroic coating with a particular combination of high or low reflectivity values at particular wavelengths. For example, a dichroic coating may have a reflectivity of less than or equal to 0.5% at approximately 1550-1560 nm and a reflectivity of greater than or equal to 90% at approximately 800-1500 nm.

In some implementations, surface A or surface B has a dielectric coating that is anti-reflecting at an operating wavelength of one or more light sources 110 contained within enclosure 155. An AR coating on surface A and surface B may increase the amount of light at an operating wavelength of light source 110 that is transmitted through the window 157. Additionally, an AR coating at an operating wavelength of the light source 110 may reduce the amount of incident light from output beam 125 that is reflected by the window 157 back into the housing 155. In an example implementation, each of surface A and surface B has an AR coating with reflectivity less than 0.5% at an operating wavelength of light source 110. As an example, if the light source 110 has an operating wavelength of approximately 1550 nm, then surface A and surface B may each have an AR coating with a reflectivity that is less than 0.5% from approximately 1547 nm to approximately 1553 nm. In another implementation, each of surface A and surface B has an AR coating with reflectivity less than 1% at the operating wavelengths of the light source 110. For example, if the housing 155 encloses two sensor heads with respective light sources, the first light source emits pulses at a wavelength of approximately 1535 nm and the second light source emits pulses at a wavelength of approximately 1540 nm, then surface A and surface B may each have an AR coating with reflectivity less than 1% from approximately 1530 nm to approximately 1545 nm.

The window 157 may have an optical transmission that is greater than any suitable value for one or more wavelengths of one or more light sources 110 contained within the housing 155. As an example, the window 157 may have an optical transmission of greater than or equal to 70%, 80%, 90%, 95%, or 99% at a wavelength of light source 110. In one example implementation, the window 157 can transmit greater than or equal to 95% of light at an operating wavelength of the light source 110. In another implementation, the window 157 transmits greater than or equal to 90% of light at the operating wavelengths of the light sources enclosed within the housing 155.

Surface A or surface B may have a dichroic coating that is anti-reflecting at one or more operating wavelengths of one or more light sources 110 and high-reflecting at wavelengths away from the one or more operating wavelengths. For example, surface A may have an AR coating for an operating wavelength of the light source 110, and surface B may have a dichroic coating that is AR at the light-source operating wavelength and HR for wavelengths away from the operating wavelength. A coating that is HR for wavelengths away from a light-source operating wavelength may prevent most incoming light at unwanted wavelengths from being transmitted through the window 117. In one implementation, if light source 110 emits optical pulses with a wavelength of approximately 1550 nm, then surface A may have an AR coating with a reflectivity of less than or equal to 0.5% from approximately 1546 nm to approximately 1554 nm. Additionally, surface B may have a dichroic coating that is AR at approximately 1546-1554 nm and HR (e.g., reflectivity of greater than or equal to 90%) at approximately 800-1500 nm and approximately 1580-1700 nm.

Surface B of the window 157 may include a coating that is oleophobic, hydrophobic, or hydrophilic. A coating that is oleophobic (or, lipophobic) may repel oils (e.g., fingerprint oil or other non-polar material) from the exterior surface (surface B) of the window 157. A coating that is hydrophobic may repel water from the exterior surface. For example, surface B may be coated with a material that is both oleophobic and hydrophobic. A coating that is hydrophilic attracts water so that water may tend to wet and form a film on the hydrophilic surface (rather than forming beads of water as may occur on a hydrophobic surface). If surface B has a hydrophilic coating, then water (e.g., from rain) that lands on surface B may form a film on the surface. The surface film of water may result in less distortion, deflection, or occlusion of an output beam 125 than a surface with a non-hydrophilic coating or a hydrophobic coating.

With continued reference to FIG. 1A, the light source 110 may include a pulsed laser configured to produce or emit pulses of light with a certain pulse duration. In an example implementation, the pulse duration or pulse width of the pulsed laser is approximately 10 picoseconds (ps) to 100 nanoseconds (ns). In another implementation, the light source 110 is a pulsed laser that produces pulses with a pulse duration of approximately 1-4 ns. In yet another implementation, the light source 110 is a pulsed laser that produces pulses at a pulse repetition frequency of approximately 100 kHz to 5 MHz or a pulse period (e.g., a time between consecutive pulses) of approximately 200 ns to 10 µs. The light source 110 may have a substantially constant or a variable pulse repetition frequency, depending on the implementation. As an example, the light source 110 may be a pulsed laser that produces pulses at a substantially constant pulse repetition frequency of approximately 640 kHz (e.g., 640,000 pulses per second), corresponding to a pulse period of approximately 1.56 µs. As another example, the light source 110 may have a pulse repetition frequency that can be varied from approximately 500 kHz to 3 MHz. As used herein, a pulse of light may be referred to as an optical pulse, a light pulse, or a pulse, and a pulse repetition frequency may be referred to as a pulse rate.

In general, the output beam 125 may have any suitable average optical power, and the output beam 125 may include optical pulses with any suitable pulse energy or peak optical power. Some examples of the average power of the output beam 125 include the approximate values of 1 mW, 10 mW, 100 mW, 1 W, and 10 W. Example values of pulse energy of the output beam 125 include the approximate values of 0.1 µJ, 1 µJ, 10 µJ, 100 µJ, and 1 mJ. Examples of peak power values of pulses included in the output beam 125 are the approximate values of 10 W, 100 W, 1 kW, 5 kW, 10 kW. An example optical pulse with a duration of 1 ns and a pulse energy of 1 µJ has a peak power of approximately 1 kW. If the pulse repetition frequency is 500 kHz, then the average power of the output beam 125 with 1-µJ pulses is approximately 0.5 W, in this example.

The light source 110 may include a laser diode, such as a Fabry-Perot laser diode, a quantum well laser, a distributed Bragg reflector (DBR) laser, a distributed feedback (DFB) laser, or a vertical-cavity surface-emitting laser (VCSEL). The laser diode operating in the light source 110 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable diode. In some implementations, the light source 110 includes a pulsed laser diode with a peak emission wavelength of approximately 1400-1600 nm. Further, the light source 110 may include a laser diode that is current-modulated to produce optical pulses.

In some implementations, the light source 110 includes a pulsed laser diode followed by one or more optical-amplification stages. For example, the light source 110 may be a fiber-laser module that includes a current-modulated laser diode with a peak wavelength of approximately 1550 nm, followed by a single-stage or a multi-stage erbium-doped fiber amplifier (EDFA). As another example, the light source 110 may include a continuous-wave (CW) or quasi-CW laser diode followed by an external optical modulator (e.g., an electro-optic modulator), and the output of the modulator may be fed into an optical amplifier. In other implementations, the light source 110 may include a laser diode which produces optical pulses that are not amplified by an optical amplifier. As an example, a laser diode (which may be referred to as a direct emitter or a direct-emitter laser diode) may emit optical pulses that form an output beam 125 that is directed downrange from a lidar system 100A. In yet other implementations, the light source 110 may include a pulsed solid-state laser or a pulsed fiber laser.

In some implementations, the output beam of light 125 emitted by the light source 110 is a collimated optical beam with any suitable beam divergence, such as a divergence of approximately 0.1 to 3.0 milliradian (mrad). Divergence of the output beam 125 may refer to an angular measure of an increase in beam size (e.g., a beam radius or beam diameter) as the output beam 125 travels away from the light source 110 or the lidar system 100A. The output beam 125 may have a substantially circular cross section with a beam divergence characterized by a single divergence value. For example, the output beam 125 with a circular cross section and a divergence of 1 mrad may have a beam diameter or spot size of approximately 10 cm at a distance of 100 m from the lidar system 100A. In some implementations, the output beam 125 may be an astigmatic beam or may have a substantially elliptical cross section and may be characterized by two divergence values. As an example, the output beam 125 may have a fast axis and a slow axis, where the fast-axis divergence is greater than the slow-axis divergence. As another example, the output beam 125 may be an astigmatic beam with a fast-axis divergence of 2 mrad and a slow-axis divergence of 0.5 mrad.

The output beam of light 125 emitted by light source 110 may be unpolarized or randomly polarized, may have no specific or fixed polarization (e.g., the polarization may vary with time), or may have a particular polarization (e.g., the output beam 125 may be linearly polarized, elliptically polarized, or circularly polarized). As an example, the light source 110 may produce linearly polarized light, and the lidar system 100A may include a quarter-wave plate that converts this linearly polarized light into circularly polarized light. The lidar system 100A may transmit the circularly polarized light as the output beam 125, and receive the input beam 135, which may be substantially or at least partially circularly polarized in the same manner as the output beam 125 (e.g., if the output beam 125 is right-hand circularly polarized, then the input beam 135 may also be right-hand circularly polarized). The input beam 135 may pass through the same quarter-wave plate (or a different quarter-wave plate), resulting in the input beam 135 being converted to linearly polarized light which is orthogonally polarized (e.g., polarized at a right angle) with respect to the linearly polarized light produced by light source 110. As another example, the lidar system 100A may employ polarization-diversity detection where two polarization components are detected separately. The output beam 125 may be linearly polarized, and the lidar system 100A may split the input beam 135 into two polarization components (e.g., s-polarization and p-polarization) which are detected separately by two photodiodes (e.g., a balanced photoreceiver that includes two photodiodes).

With continued reference to FIG. 1A, the output beam 125 and input beam 135 may be substantially coaxial. In other words, the output beam 125 and input beam 135 may at least partially overlap or share a common propagation axis, so that the input beam 135 and the output beam 125 travel along substantially the same optical path (albeit in opposite directions). As the lidar system 100A scans the output beam 125 across a field of regard, the input beam 135 may follow along with the output beam 125, so that the coaxial relationship between the two beams is maintained.

The lidar system 100A also may include one or more optical components configured to condition, shape, filter, modify, steer, or direct the output beam 125 and/or the input beam 135. For example, lidar system 100A may include one or more lenses, mirrors, filters (e.g., bandpass or interference filters), beam splitters, polarizers, polarizing beam splitters, wave plates (e.g., half-wave or quarter-wave plates), diffractive elements, or holographic elements. In some implementations, lidar system 100A includes a telescope, one or more lenses, or one or more mirrors to expand, focus, or collimate the output beam 125 to a desired beam diameter or divergence. As an example, the lidar system 100A may include one or more lenses to focus the input beam 135 onto an active region of the receiver 140. As another example, the lidar system 100A may include one or more flat mirrors or curved mirrors (e.g., concave, convex, or parabolic mirrors) to steer or focus the output beam 125 or the input beam 135. For example, the lidar system 100A may include an off-axis parabolic mirror to focus the input beam 135 onto an active region of receiver 140. As illustrated in FIG. 1A, the lidar system 100A may include the mirror 115, which may be a metallic or dielectric mirror. The mirror 115 may be configured so that the light beam 125 passes through the mirror 115. As an example, mirror 115 may include a hole, slot, or aperture through which the output light beam 125 passes. As another example, the mirror 115 may be configured so that at least 80% of the output beam 125 passes through the mirror 115 and at least 80% of the input beam 135 is reflected by the mirror 115. In some implementations, the mirror 115 may provide for the output beam 125 and the input beam 135 to be substantially coaxial, so that the beams 125 and 135 travel along substantially the same optical path, in opposite directions.

Generally speaking, the scanner 120 steers the output beam 125 in one or more directions downrange. The scanner 120 may include one or more scanning mirrors and one or more actuators driving the mirrors to rotate, tilt, pivot, or move the mirrors in an angular manner about one or more axes, for example. For example, the first mirror of the scanner may scan the output beam 125 along a first direction, and the second mirror may scan the output beam 125 along a second direction that is substantially orthogonal to the first direction. Example implementations of the scanner 120 are discussed in more detail below with reference to FIG. 2.

The scanner 120 may be configured to scan the output beam 125 over a 5-degree angular range, 20-degree angular range, 30-degree angular range, 60-degree angular range, or any other suitable angular range. For example, a scanning mirror may be configured to periodically rotate over a 15-degree range, which results in the output beam 125 scanning across a 30-degree range (e.g., a Θ-degree rotation by a scanning mirror results in a 2Θ-degree angular scan of the output beam 125). A field of regard (FOR) of the lidar system 100A may refer to an area, region, or angular range over which the lidar system 100A may be configured to scan or capture distance information. When the lidar system 100A scans the output beam 125 within a 30-degree scanning range, the lidar system 100A may be referred to as having a 30-degree angular field of regard. As another example, a lidar system 100A with a scanning mirror that rotates over a 30-degree range may produce the output beam 125 that scans across a 60-degree range (e.g., a 60-degree FOR). In various implementations, the lidar system 100A may have a FOR of approximately 10°, 20°, 40°, 60°, 120°, or any other suitable FOR. The FOR also may be referred to as a scan region.

The scanner 120 may be configured to scan the output beam 125 horizontally and vertically, and the lidar system 100A may have a particular FOR along the horizontal direction and another particular FOR along the vertical direction. For example, the lidar system 100A may have a horizontal FOR of 10° to 120° and a vertical FOR of 2° to 45°.

The one or more scanning mirrors of the scanner 120 may be communicatively coupled to the controller 150 which may control the scanning mirror(s) so as to guide the output beam 125 in a desired direction downrange or along a desired scan pattern. In general, a scan pattern may refer to a pattern or path along which the output beam 125 is directed, and also may be referred to as an optical scan pattern, optical scan path, or scan path. As an example, the scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. The lidar system 100A can use the scan path to generate a point cloud with pixels that substantially cover the 60°×20° FOR. The pixels may be approximately evenly distributed across the 60°×20° FOR. Alternately, the pixels may have a particular non-uniform distribution (e.g., the pixels may be distributed across all or a portion of the 60°×20° FOR, and the pixels may have a higher density in one or more particular regions of the 60°×20° FOR).

In operation, the light source 110 may emit pulses of light which the scanner 120 scans across a FOR of lidar system 100A. The target 130 may scatter one or more of the emitted pulses, and the receiver 140 may detect at least a portion of the pulses of light scattered by the target 130.

The receiver 140 may be referred to as (or may include) a photoreceiver, optical receiver, optical sensor, detector, photodetector, or optical detector. The receiver 140 in some implementations receives or detects at least a portion of the input beam 135 and produces an electrical signal that corresponds to the input beam 135. For example, if the input beam 135 includes an optical pulse, then the receiver 140 may produce an electrical current or voltage pulse that corresponds to the optical pulse detected by the receiver 140.

In an example implementation, the receiver 140 includes one or more avalanche photodiodes (APDs) or one or more single-photon avalanche diodes (SPADs). In another implementation, the receiver 140 includes one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions).

The receiver 140 may have an active region or an avalanche-multiplication region that includes silicon, germanium, or InGaAs. The active region of receiver 140 may have any suitable size, such as for example, a diameter or width of approximately 50-500 µm. The receiver 140 may include circuitry that performs signal amplification, sampling, filtering, signal conditioning, analog-to-digital conversion, time-to-digital conversion, pulse detection, threshold detection, rising-edge detection, or falling-edge detection. For example, the receiver 140 may include a transimpedance amplifier that converts a received photocurrent (e.g., a current produced by an APD in response to a received optical signal) into a voltage signal. The receiver 140 may direct the voltage signal to pulse-detection circuitry that produces an analog or digital output signal 145 that corresponds to one or more characteristics (e.g., rising edge, falling edge, amplitude, or duration) of a received optical pulse. For example, the pulse-detection circuitry may perform a time-to-digital conversion to produce a digital output signal 145. The receiver 140 may send the electrical output signal 145 to the controller 150 for processing or analysis, e.g., to determine a time-of-flight value corresponding to a received optical pulse.

The controller 150 may be electrically coupled or otherwise communicatively coupled to one or more of the light source 110, the scanner 120, and the receiver 140. The controller 150 may receive electrical trigger pulses or edges from the light source 110, where each pulse or edge corresponds to the emission of an optical pulse by the light source 110. The controller 150 may provide instructions, a control signal, or a trigger signal to the light source 110 indicating when the light source 110 should produce optical pulses. For example, the controller 150 may send an electrical trigger signal that includes electrical pulses, where the light source 110 emits an optical pulse in response to each electrical pulse. Further, the controller 150 may cause the light source 110 to adjust one or more of the frequency, period, duration, pulse energy, peak power, average power, or wavelength of the optical pulses produced by light source 110.

The controller 150 may determine a time-of-flight value for an optical pulse based on timing information associated with when the pulse was emitted by light source 110 and when a portion of the pulse (e.g., the input beam 135) was detected or received by the receiver 140. The controller 150 may include circuitry that performs signal amplification, sampling, filtering, signal conditioning, analog-to-digital conversion, time-to-digital conversion, pulse detection, threshold detection, rising-edge detection, or falling-edge detection.

As indicated above, the lidar system 100A may be used to determine the distance to one or more downrange targets 130. By scanning the lidar system 100A across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. For example, a depth map may cover a field of regard that extends 60° horizontally and 15° vertically, and the depth map may include a frame of 100-2000 pixels in the horizontal direction by 4-400 pixels in the vertical direction.

The lidar system 100A may be configured to repeatedly capture or generate point clouds of a field of regard at any suitable frame rate between approximately 0.1 frames per second (FPS) and approximately 1,000 FPS. For example, the lidar system 100A may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. In an example implementation, the lidar system 100A is configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). The point-cloud frame rate may be substantially fixed or dynamically adjustable, depending on the implementation. For example, the lidar system 100A may capture one or more point clouds at a particular frame rate (e.g., 1 Hz) and then switch to capture one or more point clouds at a different frame rate (e.g., 10 Hz). In general, the lidar system can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 100A can overlap, encompass, or enclose at least a portion of the target 130, which may include all or part of an object that is moving or stationary relative to lidar system 100A. For example, the target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

One type of lidar system 100A is a pulsed lidar system in which the light source 110 emits pulses of light, and the distance to a remote target 130 is determined from the time-of-flight for a pulse of light to travel to the target 130 and back. Another type of lidar system 100A is a frequency-modulated lidar system, which may be referred to as a frequency-modulated continuous-wave (FMCW) lidar system. A FMCW lidar system uses frequency-modulated light to determine the distance to a remote target 130 based on a modulation frequency of the received light (which is scattered from a remote target) relative to the modulation frequency of the emitted light. For example, for a linearly chirped light source (e.g., a frequency modulation that produces a linear change in frequency with time), the larger the frequency difference between the emitted light and the received light, the farther away the target 130 is located. The frequency difference can be determined by mixing the received light with a portion of the emitted light (e.g., by coupling the two beams onto an APD, or coupling analog electrical signals) and measuring the resulting beat frequency. For example, the electrical signal from an APD can be analyzed using a fast Fourier transform (FFT) technique to determine the difference frequency between the emitted light and the received light.

If a linear frequency modulation m (e.g., in units of Hz/s) is applied to a CW laser, then the distance D from the target 130 to the lidar system 100A may be expressed as $D=c \cdot \Delta f/(2m)$, where c is the speed of light and $\Delta f$ is the difference in frequency between the transmitted light and the received light. For example, for a linear frequency modulation of $10^{12}$ Hz/s (or, 1 MHz/µs), if a frequency difference of 330 kHz is measured, then the distance to the target is approximately 50 meters. Additionally, a frequency difference of 1.33 MHz corresponds to a target located approximately 200 meters away.

The light source 110 for a FMCW lidar system can be a fiber laser (e.g., a seed laser diode followed by one or more optical amplifiers) or a direct-emitter laser diode. The seed laser diode or the direct-emitter laser diode can be operated in a CW manner (e.g., by driving the laser diode with a substantially constant DC current), and the frequency modulation can be provided by an external modulator (e.g., an electro-optic phase modulator). Alternatively, the frequency modulation can be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) can have any suitable frequency or shape (e.g., sinusoidal, triangle-wave, or sawtooth).

An optical element 122A, disposed downrange of the scanner 120, can cause the power of the output beam 125 to be greater when oriented toward the center of the FOR of the lidar system 100A, and smaller when oriented closer to the periphery of the FOR. The OE 122A can cause the power to increase as the output beam 125 approaches one of the lower or upper edges of the FOR and/or one of the left or right edges of the FOR. The OE 122A can be a diffractive element, a refractive element (e.g., a prism), a holographic element, or a similar device. Further, the OE 122A can be implemented in the form of a thin-film filter deposited on the interior surface (Surface A) of the window 157. Still further, the OE 122A can be fixed or electronically configurable by the controller 150 or another suitable processing unit.

Figure 1B:
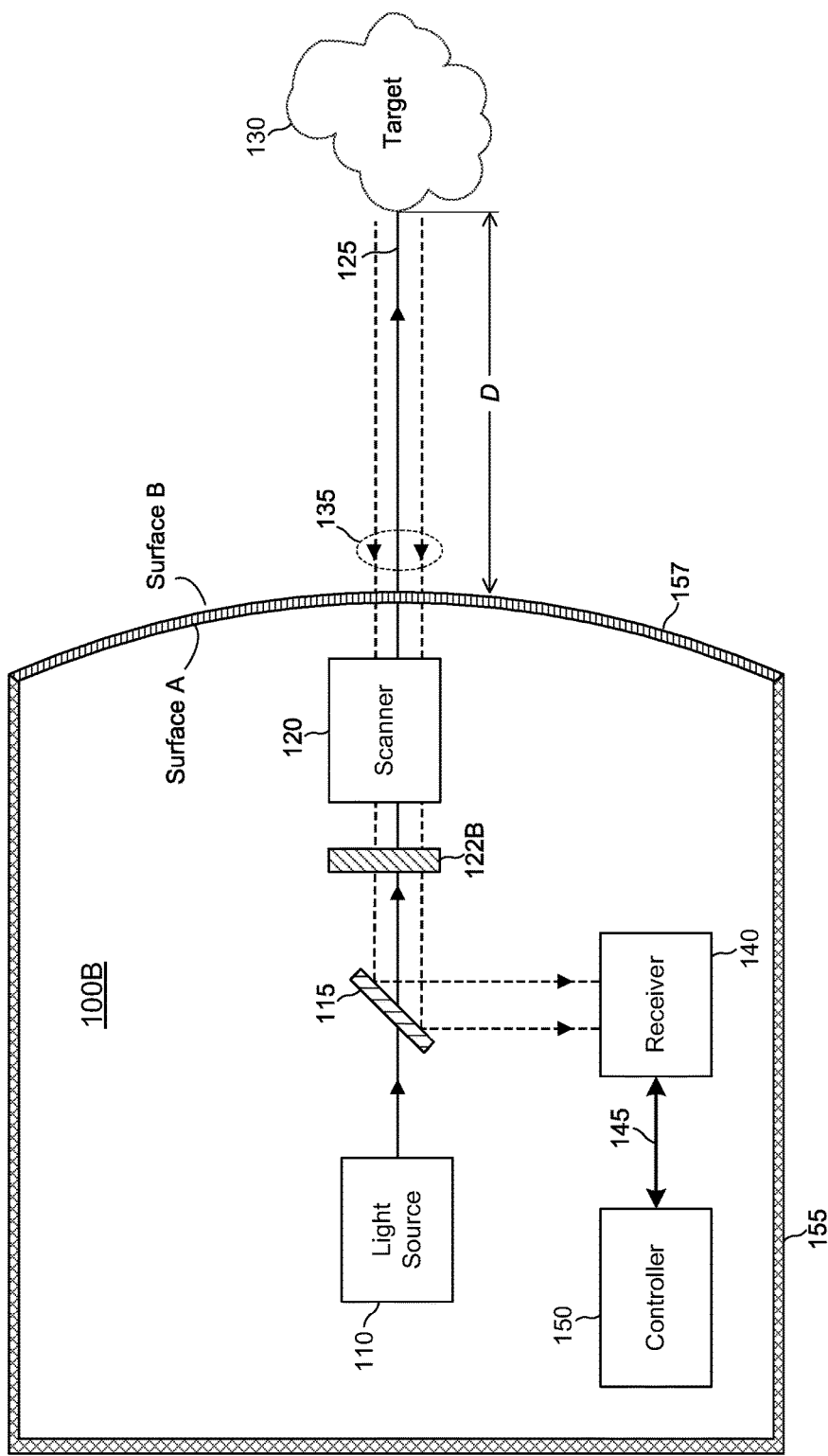
FIG. 1B is a block diagram of another example lidar system in which an OE disposed uprange of the scanner provides non-uniform distribution of power across the field of regard.

FIG. 1B illustrates a lidar system 100B that is generally similar to the lidar system 100A discussed above, except that an optical element 122B in this example implementation is disposed between the overlap mirror 115 and the scanner 120. The optical element 122B can be configured to operate similar to the optical element 122A, but the different placement of the optical 122B on the path of the output beam 125 may require different configuration of the optical element 122B.

Figure 2:
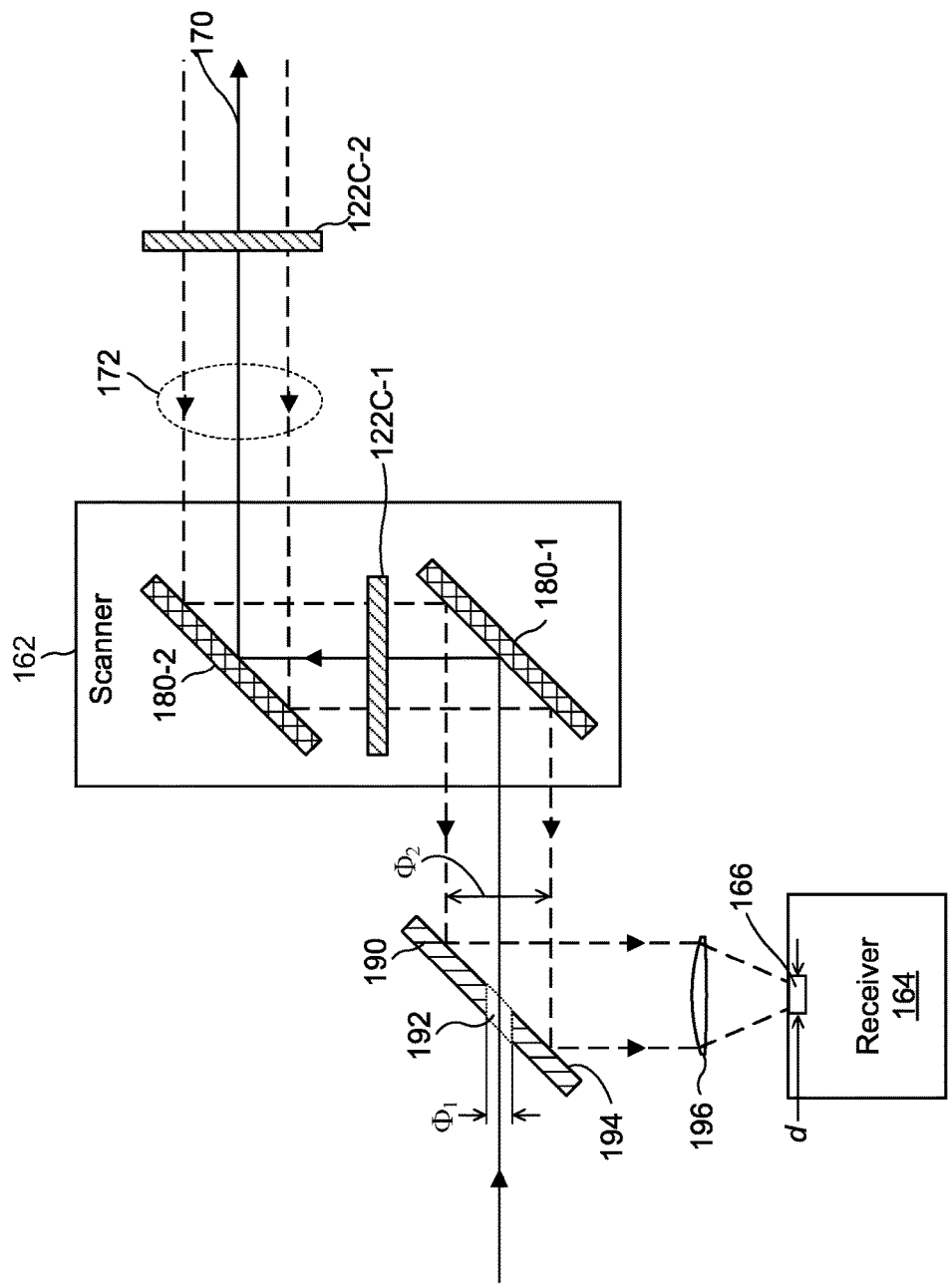
FIG. 2 illustrates in more detail several components that can operate in the system of FIG. 1A or 1B.

Now referring to FIG. 2, a scanner 162 and a receiver 164 can operate in the lidar system of FIG. 1A or 1B as the scanner 120 and the receiver 140, respectively. More generally, the scanner 162 and the receiver 164 can operate in any suitable lidar system.

The scanner 162 may include any suitable number of mirrors driven by any suitable number of mechanical actuators. For example, the scanner 162 may include a galvanometer scanner, a resonant scanner, a piezoelectric actuator, a polygonal scanner, a rotating-prism scanner, a voice coil motor, a DC motor, a brushless DC motor, a stepper motor, or a microelectromechanical systems (MEMS) device, or any other suitable actuator or mechanism.

A galvanometer scanner (which also may be referred to as a galvanometer actuator) may include a galvanometer-based scanning motor with a magnet and coil. When an electrical current is supplied to the coil, a rotational force is applied to the magnet, which causes a mirror attached to the galvanometer scanner to rotate. The electrical current supplied to the coil may be controlled to dynamically change the position of the galvanometer mirror. A resonant scanner (which may be referred to as a resonant actuator) may include a spring-like mechanism driven by an actuator to produce a periodic oscillation at a substantially fixed frequency (e.g., 1 kHz). A MEMS-based scanning device may include a mirror with a diameter between approximately 1 and 10 mm, where the mirror is rotated using electromagnetic or electrostatic actuation. A voice coil motor (which may be referred to as a voice coil actuator) may include a magnet and coil. When an electrical current is supplied to the coil, a translational force is applied to the magnet, which causes a mirror attached to the magnet to move or rotate.

In an example implementation, the scanner 162 includes a single mirror configured to scan an output beam 170 along a single direction (e.g., the scanner 162 may be a one-dimensional scanner that scans along a horizontal or vertical direction). The mirror may be a flat scanning mirror attached to a scanner actuator or mechanism which scans the mirror over a particular angular range. The mirror may be driven by one actuator (e.g., a galvanometer) or two actuators configured to drive the mirror in a push-pull configuration. When two actuators drive the mirror in one direction in a push-pull configuration, the actuators may be located at opposite ends or sides of the mirror. The actuators may operate in a cooperative manner so that when one actuator pushes on the mirror, the other actuator pulls on the mirror, and vice versa. In another example implementation, two voice coil actuators arranged in a push-pull configuration drive a mirror along a horizontal or vertical direction.

In some implementations, the scanner 162 may include one mirror configured to be scanned along two axes, where two actuators arranged in a push-pull configuration provide motion along each axis. For example, two resonant actuators arranged in a horizontal push-pull configuration may drive the mirror along a horizontal direction, and another pair of resonant actuators arranged in a vertical push-pull configuration may drive mirror along a vertical direction. In another example implementation, two actuators scan the output beam 170 along two directions (e.g., horizontal and vertical), where each actuator provides rotational motion along a particular direction or about a particular axis.

The scanner 162 also may include one mirror driven by two actuators configured to scan the mirror along two substantially orthogonal directions. For example, a resonant actuator or a galvanometer actuator may drive one mirror along a substantially horizontal direction, and a galvanometer actuator may drive the mirror along a substantially vertical direction. As another example, two resonant actuators may drive a mirror along two substantially orthogonal directions.

In some implementations, the scanner 162 includes two mirrors, where one mirror scans the output beam 170 along a substantially horizontal direction and the other mirror scans the output beam 170 along a substantially vertical direction. In the example of FIG. 2, the scanner 162 includes two mirrors, a mirror 180-1 and a mirror 180-2. The mirror 180-1 may scan the output beam 170 along a substantially horizontal direction, and the mirror 180-2 may scan the output beam 170 along a substantially vertical direction (or vice versa). Mirror 180-1 or mirror 180-2 may be a flat mirror, a curved mirror, or a polygon mirror with two or more reflective surfaces, as discussed in more detail below.

The scanner 162 in other implementations includes two galvanometer scanners driving respective mirrors. For example, the scanner 162 may include a galvanometer actuator that scans the mirror 180-1 along a first direction (e.g., vertical), and the scanner 162 may include another galvanometer actuator that scans the mirror 180-2 along a second direction (e.g., horizontal). In yet another implementation, the scanner 162 includes two mirrors, where a galvanometer actuator drives one mirror, and a resonant actuator drives the other mirror. For example, a galvanometer actuator may scan the mirror 180-1 along a first direction, and a resonant actuator may scan the mirror 180-2 along a second direction. The first and second scanning directions may be substantially orthogonal to one another, e.g., the first direction may be substantially vertical, and the second direction may be substantially horizontal. In yet another implementation, the scanner 162 includes two mirrors, where one mirror is a polygon mirror that is rotated in one direction (e.g., clockwise or counter-clockwise) by an electric motor (e.g., a brushless DC motor). For example, mirror 180-1 may be a polygon mirror that scans the output beam 170 along a substantially horizontal direction, and mirror 180-2 may scan the output beam 170 along a substantially vertical direction.

To direct the output beam 170 along a particular scan pattern, the scanner 162 may include two or more actuators driving a single mirror synchronously. For example, the two or more actuators can drive the mirror synchronously along two substantially orthogonal directions to make the output beam 170 follow a scan pattern with substantially straight lines. In some implementations, the scanner 162 may include two mirrors and actuators driving the two mirrors synchronously to generate a scan pattern that includes substantially straight lines. For example, a galvanometer actuator may drive the mirror 180-2 with a substantially linear back-and-forth motion (e.g., the galvanometer may be driven with a substantially sinusoidal or triangle-shaped waveform) that causes the output beam 170 to trace a substantially horizontal back-and-forth pattern, and another galvanometer actuator may scan the mirror 180-1 along a substantially vertical direction. The two galvanometers may be synchronized so that for every 64 horizontal traces, the output beam 170 makes a single trace along a vertical direction. Whether one or two mirrors are used, the substantially straight lines can be directed substantially horizontally, vertically, or along any other suitable direction.

The scanner 162 also may apply a dynamically adjusted deflection along a vertical direction (e.g., with a galvanometer actuator) as the output beam 170 is scanned along a substantially horizontal direction (e.g., with a galvanometer or resonant actuator) to achieve the straight lines. If a vertical deflection is not applied, the output beam 170 may trace out a curved path as it scans from side to side. In some implementations, the scanner 162 uses a vertical actuator to apply a dynamically adjusted vertical deflection as the output beam 170 is scanned horizontally as well as a discrete vertical offset between each horizontal scan (e.g., to step the output beam 170 to a subsequent row of a scan pattern).

With continued reference to FIG. 2, an overlap mirror 190 in this example implementation is configured to overlap the input beam 172 and output beam 170, so that the beams 170 and 172 are substantially coaxial. In FIG. 2, the overlap mirror 190 includes a hole, slot, or aperture 192 through which the output beam 170 passes, and a reflecting surface 194 that reflects at least a portion of the input beam 172 toward the receiver 164. The overlap mirror 190 may be oriented so that input beam 172 and output beam 170 are at least partially overlapped.

In some implementations, the overlap mirror 190 may not include a hole 192. For example, the output beam 170 may be directed to pass by a side of mirror 190 rather than passing through an aperture 192. The output beam 170 may pass alongside mirror 190 and may be oriented at a slight angle with respect to the orientation of the input beam 172. As another example, the overlap mirror 190 may include a small reflective section configured to reflect the output beam 170, and the rest of the overlap mirror 190 may have an AR coating configured to transmit the input beam 172.

The input beam 172 may pass through a lens 196 which focuses the beam onto an active region 166 of the receiver 164. The active region 166 may refer to an area over which receiver 164 may receive or detect input light. The active region may have any suitable size or diameter d, such as for example, a diameter of approximately 25 µm, 50 µm, 80 µm, 100 µm, 200 µm, 500 µm, 1 mm, 2 mm, or 5 mm. The overlap mirror 190 may have a reflecting surface 194 that is substantially flat or the reflecting surface 194 may be curved (e.g., the mirror 190 may be an off-axis parabolic mirror configured to focus the input beam 172 onto an active region of the receiver 140).

The aperture 192 may have any suitable size or diameter $\Phi_1$, and the input beam 172 may have any suitable size or diameter $\Phi_2$, where $\Phi_2$ is greater than $\Phi_1$. For example, the aperture 192 may have a diameter $\Phi_1$ of approximately 0.2 mm, 0.5 mm, 1 mm, 2 mm, 3 mm, 5 mm, or 10 mm, and the input beam 172 may have a diameter $\Phi_2$ of approximately 2 mm, 5 mm, 10 mm, 15 mm, 20 mm, 30 mm, 40 mm, or 50 mm. In some implementations, the reflective surface 194 of the overlap mirror 190 may reflect 70% or more of input beam 172 toward the receiver 164. For example, if the reflective surface 194 has a reflectivity R at an operating wavelength of the light source 160, then the fraction of input beam 172 directed toward the receiver 164 may be expressed as $R \times [1-\Phi_1/\Phi_2)^2]$. As a more specific example, if R is 95%, $\Phi_1$ is 2 mm, and $\Phi_2$ is 10 mm, then approximately 91% of the input beam 172 may be directed toward the receiver 164 by the reflective surface 194.

An optical element 122C-1 in this example implementation is disposed between the mirror 180-1 and 180-2. One or more facets of the optical element 122C-1 can be disposed on a plane orthogonal to the output beam 170 directed at the geometric center of the FOR. In another implementation, the one or more facets of the optical element 122C-1 are oriented at an acute angle relative to the output beam 170 aimed at the geometric center of the FOR.

Further, another optical 122C-2 can be disposed downrange of the scanner 162. For example, the optical element 122C-1 can be configured and/or positioned so that more power is directed toward the center scan lines in the FOR than upper or lower scan lines, and the optical element 122C-2 can be configured and/or positioned so that more power is directed toward pixels that are closer to the center of FOR, and less power is directed toward pixels that are closer to the right and left edges of the FOR.

Figure 3A:
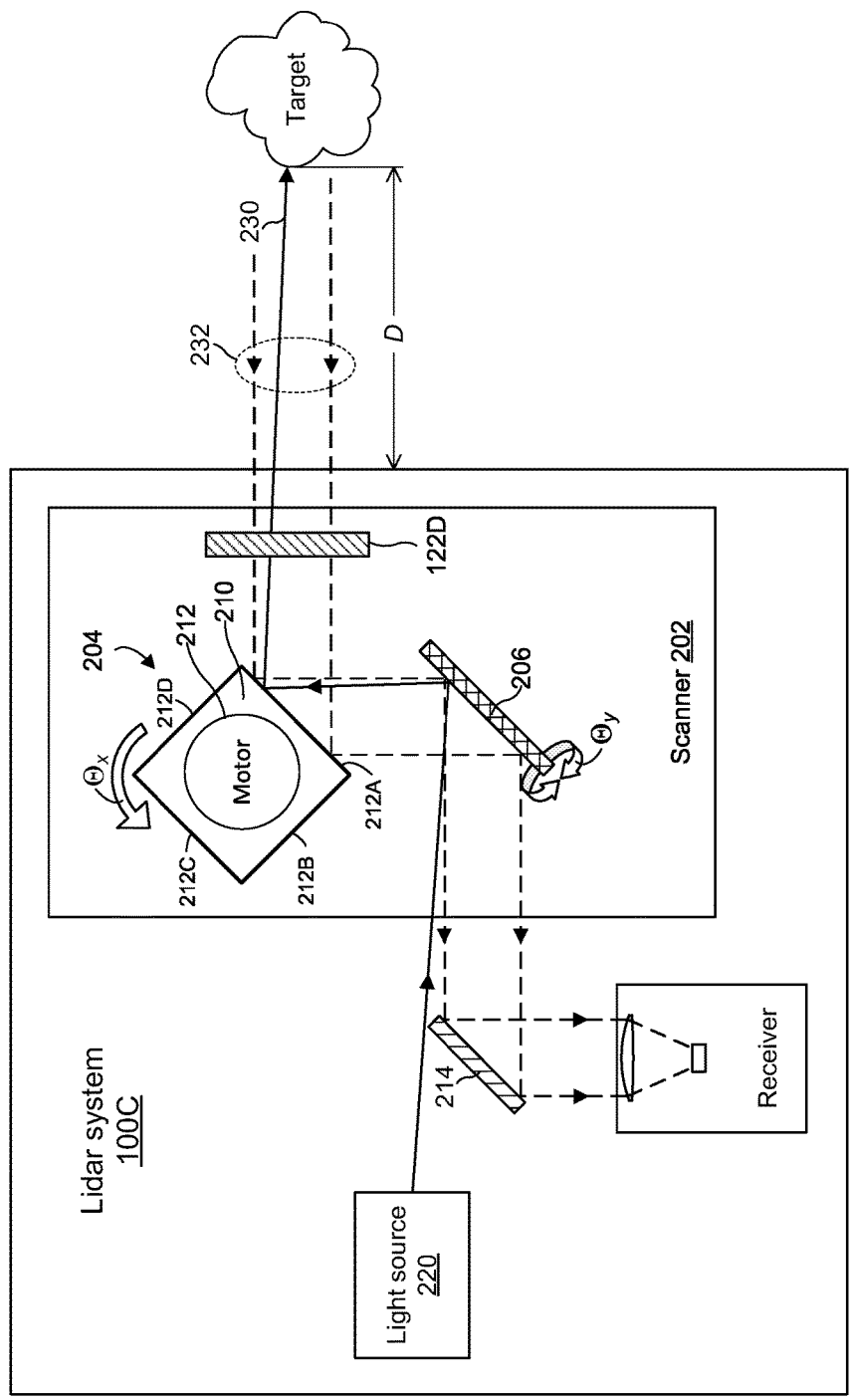
FIG. 3A is a block diagram of an example lidar system in which a scanner equipped with a polygon mirror is configured to operate in a one-eye configuration, and an OE provides non-uniform distribution of power across the field of regard.

Now referring to FIG. 3A, an example lidar system 100C is generally similar to the lidar systems 100A and 100B discussed above. However, the lidar system 100C includes a scanner 202 with a polygon mirror 204 along with an oscillating or pivotable plane scan mirror 206, so simply "scan mirror" 206, rather than two oscillating mirrors as in the systems discussed above. The lidar system 100C operates in a one-eye configuration.

The polygon mirror 204 may be in the form of a rotatable block 210 with multiple reflective surfaces angularly offset from one another along the polygon periphery of the rotatable block. In this example implementation, the polygon mirror 204 has four reflective surfaces 212A-212D. A motor 212 can impart rotation to the rotatable polygon mirror 204. The scan mirror 206 rotates, in an oscillatory manner within a certain angular range, about an axis orthogonal to an axis of rotation of the polygon mirror 204. A galvanometer scanner or another suitable device can impart oscillation to the scan mirror 206.

As the polygon mirror 204 rotates, the scanner 202 produces one scan line for each reflective surface of the polygon mirror 204. The scan mirror 206 pivots to distribute the scan lines across the FOR. Thus, if the scan lines are directed horizontally, the polygon mirror 204 is responsible primarily for the horizontal dimension of the field of regard (FOR$_H$), and the scan mirror 206 accordingly is responsible for vertical dimension of the field of regard (FOR$_V$). In other implementations or orientations, however, the polygon mirror 204 can be responsible for FOR$_V$, and the scan mirror 206 can be responsible for FOR$_H$.

Further, the lidar system 100C includes an aperture-free overlap mirror 214 to implement an off-axis illumination technique. More specifically, unlike the overlap mirror 115 of FIGS. 1A and 1B, the overlap mirror 214 need not include an aperture. The light source 220 in this implementation directs an output beam 230 toward the scanner 202 along a path adjacent to the overlap mirror 214. A reflective surface of the scan mirror 206 reflects the output beam 230 toward one of the reflective surfaces 212A-D of the polygon mirror 204. In this implementation, the polygon mirror 204 directs the output beam 230 toward a target at a horizontal angle defined by the current rotational position of the polygon mirror 204, and a vertical angle defined by the current rotational position of the scan mirror 206. In another implementation, however, the rotational position of the polygon mirror 204 defines the vertical angle, and the rotational position of the scan mirror 206 defines the horizontal angle.

The output beam 230 and an input beam 232 thus are not entirely coaxial. As illustrated in FIG. 3A in an exaggerated manner, the beams 230 and 232 have a small spatial offset or, in some implementations, a small angular offset. This configuration allows return pulses from nearby targets to arrive at the mirror 214 along an axis that is not parallel to the output beam 230, while return pulses from far-away targets arrive at the mirror 214 along an axis that is substantially parallel to the output beam 230.

An optical element 122D can be disposed downrange of the polygon mirror 204 to provide non-uniform distribution of power across different scan lines and/or columns. Alternatively or additionally, another optical element 122D or a similar device can be disposed between the scan mirror 206 and the polygon mirror 204, or between the light source 220 and the scan mirror 206.

Figure 3B:
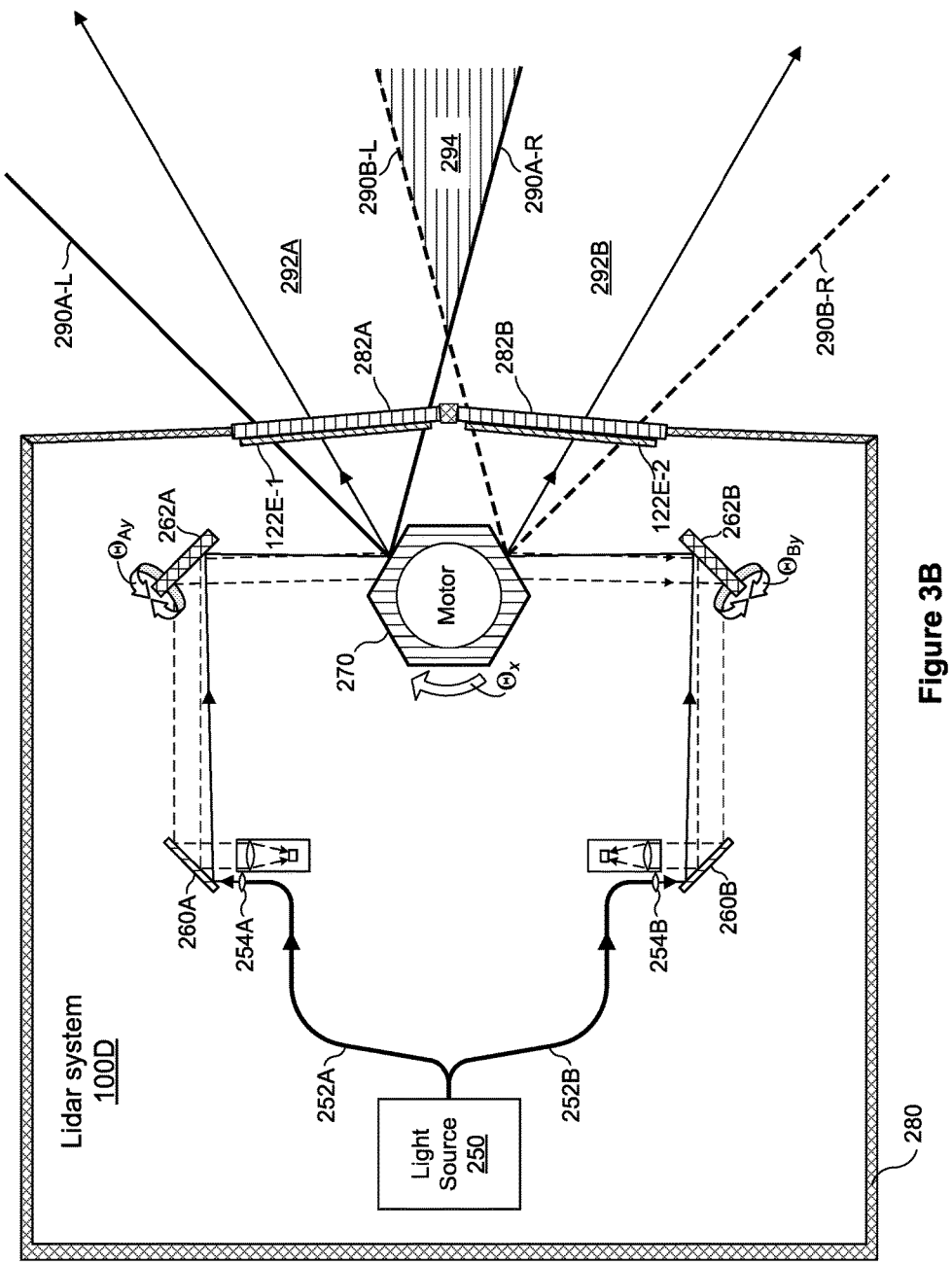
FIG. 3B is a block diagram of an example lidar system in which a scanner equipped with a polygon mirror is configured to operate in a two-eye configuration, and OEs provide non-uniform distribution of power across the field of regard.

FIG. 3B illustrates an example two-eye implementation of a lidar system. The lidar system 100D includes a light source 250 provides laser pulses to collimators 254-A and 254B via respective laser-sensor links 252A and 252B. Stationary mirrors 260A and 260B provide folds to the input and output beams in the corresponding eyes of the lidar system 100D. The stationary mirrors 260A and 260B thereby can reduce the overall three-dimensional size of the lidar system 100D.

The laser-sensor links 252A and 252B can be an optical fiber of any suitable length. Each of the laser-sensor links 252A and 252B can include any suitable number of optical links (e.g., 0, 1, 2, 3, 5, or 10). An optical link may include optical fiber (which may be referred to as fiber-optic cable or fiber) that conveys, carries, transports, or transmits light between the light source 250 and the sensor collimator 254A. The optical fiber may be, for example, single-mode (SM) fiber, multi-mode (MM) fiber, large-mode-area (LMA) fiber, polarization-maintaining (PM) fiber, photonic-crystal or photonic-bandgap fiber, gain fiber (e.g., rare-earth-doped optical fiber for use in an optical amplifier), or any suitable combination thereof. The output collimator 254A receives optical pulses conveyed from the laser light source 250 by the optical link of the laser-sensor links 252A and produces a free-space optical beam that includes the optical pulses. The output collimator 254A directs the free-space optical beam toward the stationary mirror 260A.

The stationary mirror 260A reflects the output beam associated with the first eye to a scan mirror 262A, which then reflects the output beam to one of the reflective surfaces of a polygon mirror 270. The stationary mirror 260B similarly reflects the output beam associated with the second eye to a scan mirror 262B, which then reflects the output beam to a different reflective surface of the polygon mirror 270. The polygon mirror 270 can be similar to the polygon mirror 204, but in this example the polygon mirror 270 has more reflective surfaces (six) than the polygon mirror 204 (four). More generally, a lidar system of this disclosure can include a rotatable polygon mirror with any suitable number of reflective surfaces, such as for example 3, 4, 5, 6, 7, 8, 9, 10, 11, or 12.

The lidar system 100D is enclosed within a housing 280 with windows 282A and 282B.

Similar to the lidar system 100C, as the polygon mirror 204 rotates, the scanner 202 produces one scan line for each reflective surface of the polygon mirror 204, for each eye of the lidar system 100D. The scan mirror 262A pivots to distribute the scan lines across the FOR of the first eye, and the scan mirror 262B pivots to distribute the scan lines across the FOR of the second eye. Thus, if the scan lines are directed horizontally, the polygon mirror 270 is responsible primarily for the horizontal dimension of the field of regard (FOR$_H$), and the scan mirrors 260A and 260B accordingly are responsible for the vertical dimension of the corresponding field of regard (FOR$_V$). In other implementations or orientations, however, the polygon mirror 270 can be responsible for FOR$_V$, and the scan mirrors 262A and 262B can be responsible for FOR$_H$.

As illustrated in FIG. 3B, the FOR 292A of the first eye extends from the left boundary 290A-L to the right boundary 290A-R, and the FOR 292B of the second eye extends from the left boundary 290B-L to the right boundary 290B-R. The FORs 292A and 292B include a region of overlap 294, in which the lidar system 100D generates a higher density of information.

In the example lidar system 100D, optical elements 122E-1 and 122E-2 are provided in the form of a coating applied to the interior surfaces of the windows 282A and 282B. Alternatively, one or more suitable optical elements can be disposed between the collimator 254A and the stationary mirror 260A, between the stationary mirror 260A and the scan mirror 262A, and/or between the scan mirror 262A and the polygon mirror 270. The other eye of the lidar system 100D can be implemented in a similar manner.

Because the FOR of the lidar system 100D is made up of the partially overlapping FORs 292A, 292B corresponding to different non-parallel, the optical element 122E-1 can be configured to direct more power toward the right edge 290A-R. The optical element 122E-2 accordingly can be configured to direct more power toward the left edge 290B-L.

Figure 4A:
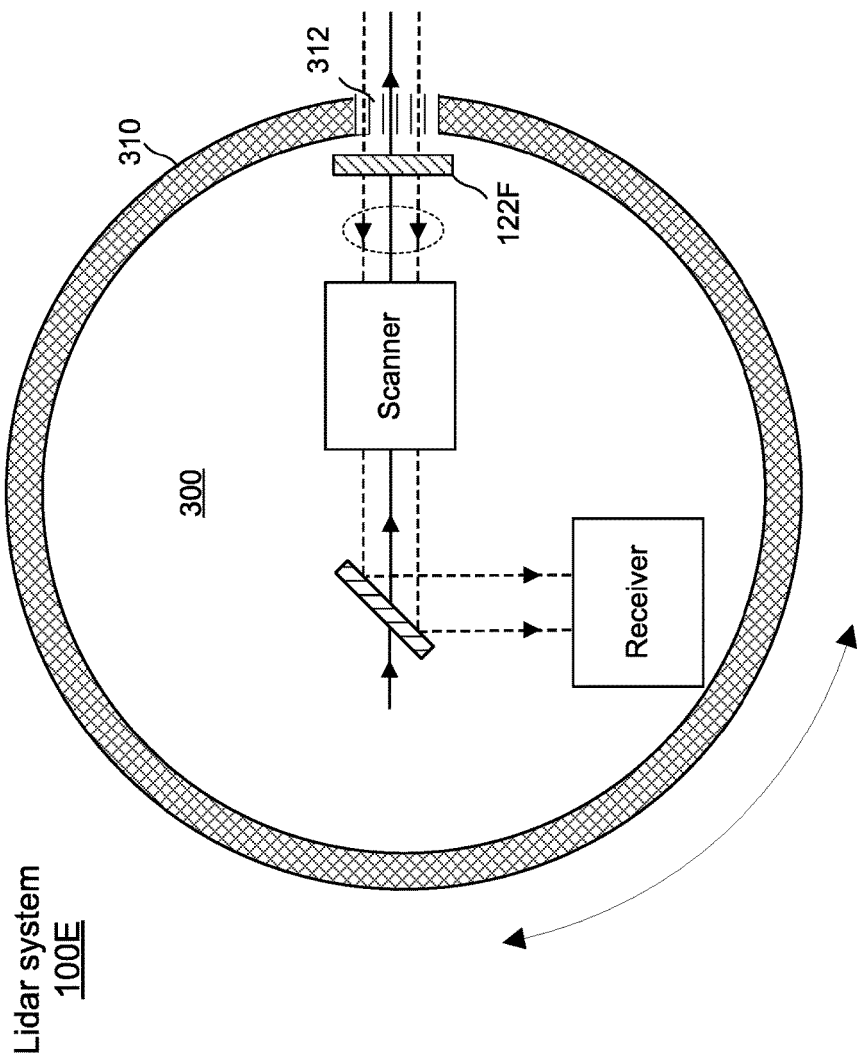
FIG. 4A illustrates an example configuration of a lidar system that scans a 360-degree field of regard through a window in a rotating housing, with an OE providing non-uniform distribution of power across the field of regard.

FIG. 4A illustrates an example configuration in which a lidar system can scan a 360-degree view of regard. Generally speaking, the field of view of a light source in this configuration follows a circular trajectory and accordingly defines a circular scan pattern on a two-dimensional plane. All points on the trajectory remain at the same elevation relative to the ground level, according to one implementation. In this case, separate beams may follow the circular trajectory with certain vertical offsets relative to each other. In another implementation, the points of the trajectory may define a spiral scan pattern in three-dimensional space. A single beam can be sufficient to trace out the spiral scan pattern but, if desired, multiple beams can be used.

In the example of FIG. 4A, a rotating scan module 300 revolves around a central axis in one or both directions as indicated. An electric motor may drive the rotating scan module 300 around the central axis at a constant speed, for example. The rotating scan module 300 includes a scanner, a receiver, an overlap mirror, etc. The components of the rotating module 300 may be similar to the scanner 162, the receiver 164, and the overlap mirror 190. In some implementations, the rotating scan module 300 also includes a light source and a controller. In other implementations, the light source and/or the controller are disposed apart from the rotating scan module 300 and/or exchange optical and electrical signals with the components of the rotating scan module 300 via corresponding optical links.

The rotating scan module 300 may include a housing 310 with a window 312. Similar to the window 157 of FIG. 1, the window 312 may be made of glass, plastic, or any other suitable material. The window 312 allows output beams as well as return signals to pass through the housing 310. The arc length defined by the window 212 can correspond to any suitable percentage of the circumference of the housing 310. For example, the arc length can correspond to 5%, 20%, 30%, 60%, or possibly even 100% of the circumference.

Figure 4B:
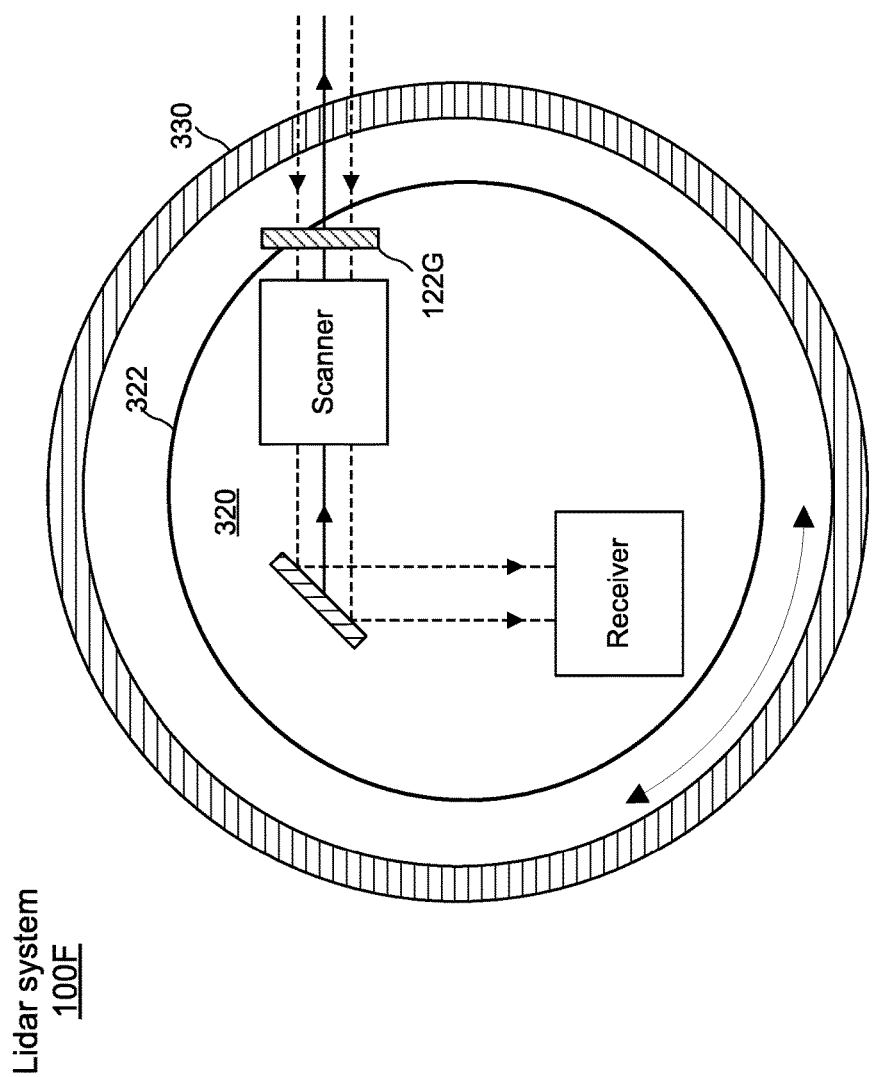
FIG. 4B illustrates an example configuration of a lidar system that scans a 360-degree field of regard through a substantially transparent stationary housing, with an OE providing non-uniform distribution of power across the field of regard.

Now referring to FIG. 4B, a rotating scan module 320 is generally similar to the rotating scan module 300 discussed above. In this implementation, however, the components of the rotating scan module 320 are disposed on a platform 322 which rotates inside a stationary circular housing 330. In this implementation, the circular housing 330 is substantially transparent to light at the lidar-system operating wavelength to pass inbound and outbound light signals. The circular housing 330 in a sense defines a circular window similar to the window 312, and may be made of similar material.

Optical elements 122F in FIG. 4A and 122G in FIG. 4B are disposed downrange of the respective scanners, and can be implemented similar to the optical element 122A discussed above with reference to FIG. 1. In these implementations, the rotation of the scan modules 300 and 320 eliminates the need for the corresponding scanner to change the horizontal orientation of the output beam.

Moreover, in one implementation, the scanner of the lidar system 100E or 100F directs a single output beam parallel to the plane on which the scan module 300 or 320 rotates. The optical element 122F or 122G then splits the output beam into multiple beams having different angular offsets and different, angular offset-dependent power. The lidar system 100E or 100F can utilize multiple detectors to detect light scattered by remote targets and corresponding to the multiple concurrent output beams.

In the implementation where separate beams follow the circular trajectory with certain vertical offsets relative to each other, the optical element 122F or 122G can reduce the power of the output beams directed downward or upward, relative to the power of the output beam directed parallel to the plane on which the scan module 300 or 320 is disposed. Alternatively, these output beams can be generated by different lasers, which can be configured to output different amounts of power in accordance with the direction in which these lasers are aimed.

Generating Pixels within a Field of Regard Using Non-Uniform Power Distribution

Figure 5:
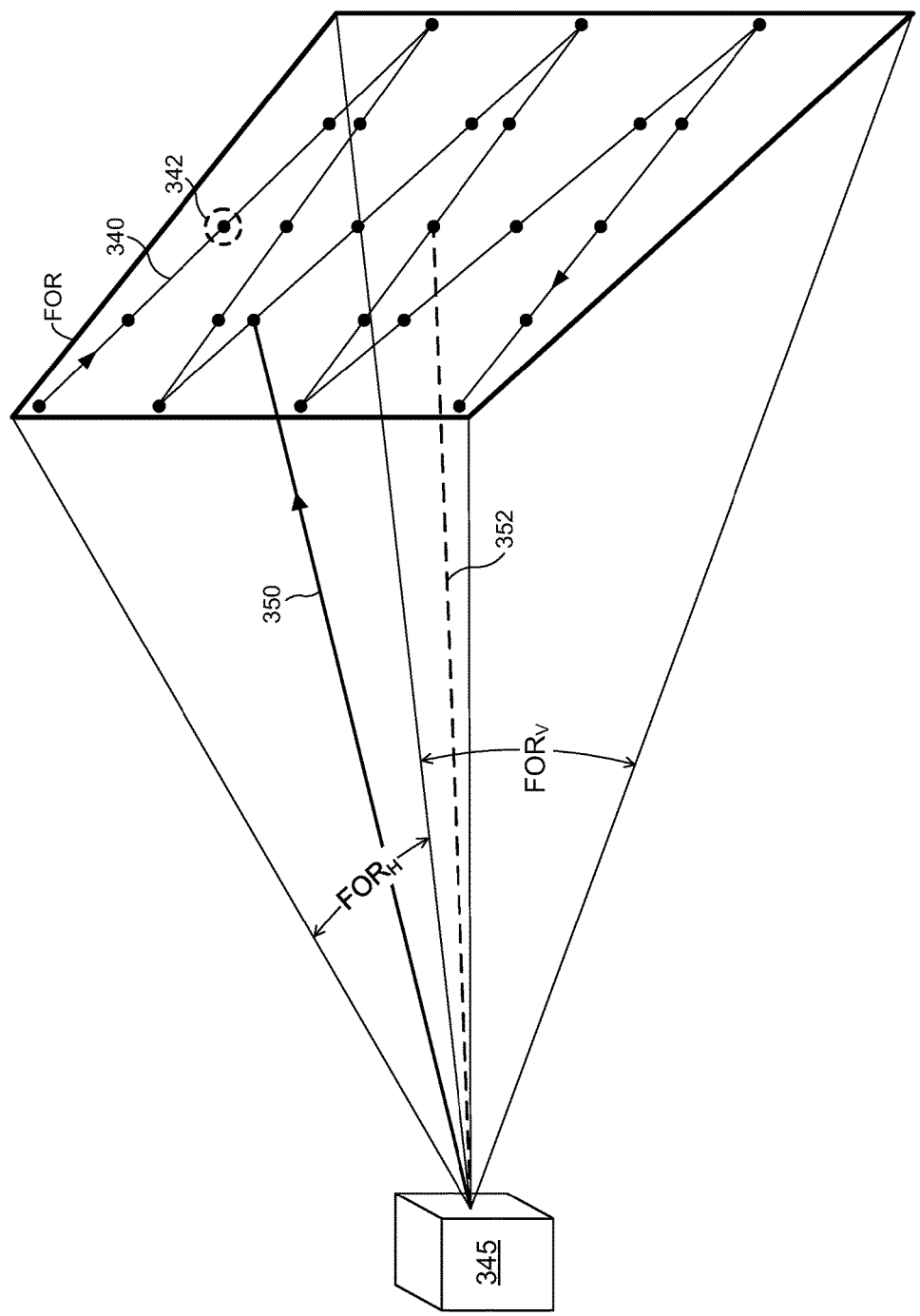
FIG. 5 illustrates an example scan pattern which the lidar system of FIG. 1A, 1B, 3A, or 3B can produce when identifying targets within a field of regard.

FIG. 5 illustrates an example scan pattern 340 which a lidar system 345 can produce. The lidar system 345 is similar to the lidar system 100A-C or one of the eyes of the lidar system 100D.

The lidar system may be configured to scan output optical beam 350 along one or more scan patterns 340. In some implementations, the scan pattern 340 corresponds to a scan across any suitable field of regard (FOR) having any suitable horizontal FOR ($FOR_H$) and any suitable vertical FOR ($FOR_V$). For example, a certain scan pattern may have a field of regard represented by angular dimensions (e.g., $FOR_H \times FOR_V$) 40°×30°, 90°×40°, or 60°×15°. As another example, a certain scan pattern may have a $FOR_H$ greater than or equal to 10°, 25°, 30°, 40°, 60°, 90°, or 120°. As yet another example, a certain scan pattern may have a $FOR_V$ greater than or equal to 2°, 5°, 10°, 15°, 20°, 30°, or 45°. In the example of FIG. 5, reference line 352 represents a center of the field of regard of scan pattern 340. The reference line 352 may have any suitable orientation, such as, a horizontal angle of 0° (e.g., the reference line 352 may be oriented straight ahead) and a vertical angle of 0° (e.g., the reference line 352 may have an inclination of 0°), or the reference line 352 may have a nonzero horizontal angle or a nonzero inclination (e.g., a vertical angle of +10° or −10°). In FIG. 5, if the scan pattern 340 has a 60°×15° field of regard, then the scan pattern 340 covers a ±30° horizontal range with respect to reference line 352 and a ±7.5° vertical range with respect to reference line 352. Additionally, the optical beam 350 in FIG. 5 has an orientation of approximately −15° horizontal and +3° vertical with respect to reference line 352. The beam 350 may be referred to as having an azimuth of −15° and an altitude of +3° relative to the reference line 352. An azimuth (which may be referred to as an azimuth angle) may represent a horizontal angle with respect to the reference line 352, and an altitude (which may be referred to as an altitude angle, elevation, or elevation angle) may represent a vertical angle with respect to the reference line 352.

The scan pattern 340 may include multiple pixels 342, and each pixel 342 may be associated with one or more laser pulses and one or more corresponding distance measurements. A cycle of scan pattern 340 may include a total of $P_x \times P_y$ pixels 342 (e.g., a two-dimensional distribution of $P_x$ by $P_y$ pixels). For example, the scan pattern 340 may include a distribution with dimensions of approximately 100-2,000 pixels 342 along a horizontal direction and approximately 4-400 pixels 342 along a vertical direction. As another example, the scan pattern 340 may include a distribution of 1,000 pixels 342 along the horizontal direction by 64 pixels 242 along the vertical direction (e.g., the frame size is 1000×64 pixels) for a total of 64,000 pixels per cycle of scan pattern 340. The number of pixels 342 along a horizontal direction may be referred to as a horizontal resolution of the scan pattern 340, and the number of pixels 342 along a vertical direction may be referred to as a vertical resolution of the scan pattern 340. As an example, the scan pattern 340 may have a horizontal resolution of greater than or equal to 100 pixels 342 and a vertical resolution of greater than or equal to 4 pixels 342. As another example, the scan pattern 340 may have a horizontal resolution of 100-2,000 pixels 342 and a vertical resolution of 4-400 pixels 342.

Each pixel 342 may be associated with a distance (e.g., a distance to a portion of a target 130 from which the corresponding laser pulse was scattered) or one or more angular values. As an example, the pixel 342 may be associated with a distance value and two angular values (e.g., an azimuth and altitude) that represent the angular location of the pixel 342 with respect to the lidar system 100A-D. A distance to a portion of the target may be determined based at least in part on a time-of-flight measurement for a corresponding pulse. An angular value (e.g., an azimuth or altitude) may correspond to an angle (e.g., relative to reference line 352) of the output beam 350 (e.g., when a corresponding pulse is emitted from lidar system 100A) or an angle of the input beam (e.g., when an input signal is received by lidar system 100A). In some implementations, the lidar system 100A-D determines an angular value based at least in part on a position of a component of the scanner. For example, an azimuth or altitude value associated with the pixel 342 may be determined from an angular position of one or more corresponding mirrors of the scanner of the lidar system.

The lidar system 345 can vary the power of the output beam 350 in accordance with the elevation angle, the azimuth angle, or both. The lidar system 345 can vary the power of the output beam 350 using passive optical elements such as DOEs, active optical elements, or without using dedicated optical elements by directing the light source to emit more or less power depending on the current orientation of the one or more mirrors that define the orientation of the beam 350 relative to the centerline of the FOR and/or the geometric center of the FOR.

Figure 6:
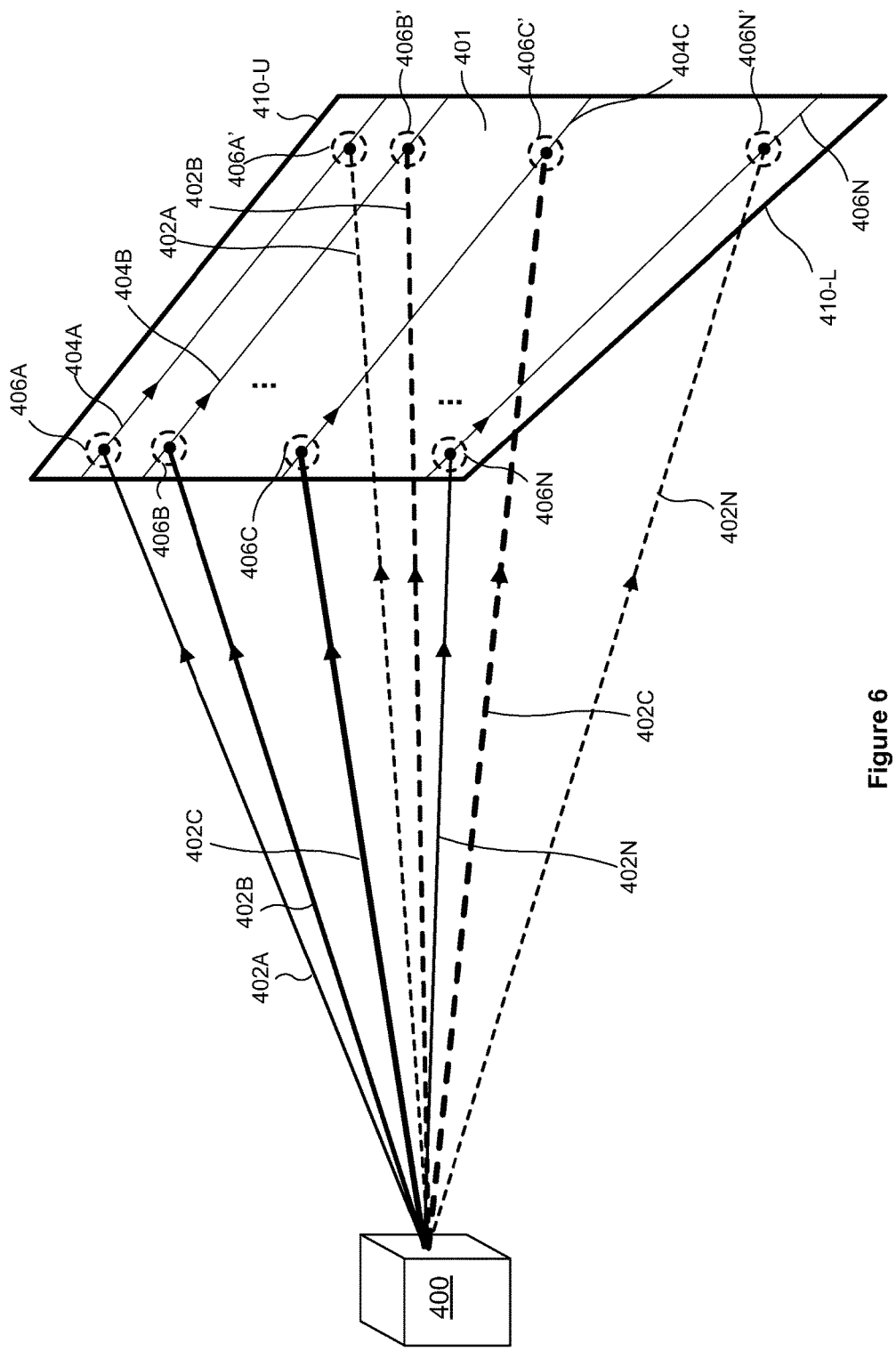
FIG. 6 illustrates an example scan pattern which the lidar system of FIG. 1A, 1B, 4A, or 4B can produce when identifying targets within a field of regard using multiple beams.

Referring to FIG. 6, a lidar system 400 concurrently directs multiple beams across a field of regard 401. The lidar system 350 can be similar to the lidar system 100A, 100B, 100E, or 100F, for example. In the example of FIG. 6, the lidar system 400 generates output beams 402A, 250B, 402C, . . . 402N, each of which follows a linear scan pattern 404A, 404B, 404C, . . . 404N, respectively. The number of parallel lines can be 2, 4, 12, 20, or any other suitable number. The lidar system 400 may angularly separate the beams 402A, 250B, 402C, . . . 402N, so that, for example, the separation between beams 402A and 402B at a certain distance may be 30 cm, and the separation between the same beams 402A and 402B at a longer distance may be 50 cm.

Similar to the scan pattern 340, each of the linear scan patterns 404A-N includes pixels associated with one or more laser pulses and distance measurements. FIG. 6 illustrates example pixels 406A, 404B, 404C, and 404N along the corresponding scan patterns 404A, 404B, 404C, and 404N, respectively. The lidar system 100A in this example may generate the values for the pixels 406A-N at the same time, thus increasing the rate at which values for pixels are determined.

The pixels 406A, 404B, 404C, and 404N are generated at a first time, and pixels 406A', 404B', 404C', and 404N' are generated at a second time using the same beams. More particularly, the lidar system 400 can first generate the pixel 406A using the beam 402A and at a later time, when the beam 402A advances in the horizontal direction along the scan pattern 404A, generate the pixel 406A' using the beam 402A. Each of the beams 402A, 402B, etc. thus generates pixels with same vertical offset relative to lower boundary of the FOR.

Depending on the implementation, the lidar system 400 may output the beams 402A-N at the same wavelength or different wavelengths. The beam 402A for example may have the wavelength of 1540 nm, the beam 402B may have the wavelength of 1550 nm, the beam 402C may have the wavelength of 1560 nm, etc. The number of different wavelengths the lidar system 400 uses need not match the number of beams. Thus, the lidar system 400 in the example implementation of FIG. 6 may use M wavelengths with N beams, where $1 \leq M \leq N$.

The lidar system 400 generates the beams 402A-N at different power levels. As schematically illustrated in FIG. 6, the beams 402A and 402N, which are closest to the respective vertical edges 410-U and 410-L of the FOR, are transmitted at less power than the beam 402B closer to the centerline of the FOR, and the beam 402B in turn is transmitted at less power than the beam 402C, which is even closer to the centerline of the FOR. The power at which beams are transmitted in this example implementation increases as the distance between the upper edge 410-U of the FOR 401 and the centerline of the FOR 401 decreases, and decreases again as the distance between the centerline of the FOR 401 and the lower edge 410-L increases.

In some implementations, the lidar system 400 also varies the power as the beams 402A, 402B, etc. advance across the FOR 401. For example, the lidar system 400 can increase the power of the beam 402A when the pixel being generated is closer to the center of the FOR 401, and accordingly decrease the power of the beam 402 when the pixel being generated is closer to the left or right vertical edge of the FOR.

Example techniques for distributing power as illustrated in FIG. 6 are discussed below.

Figure 7:
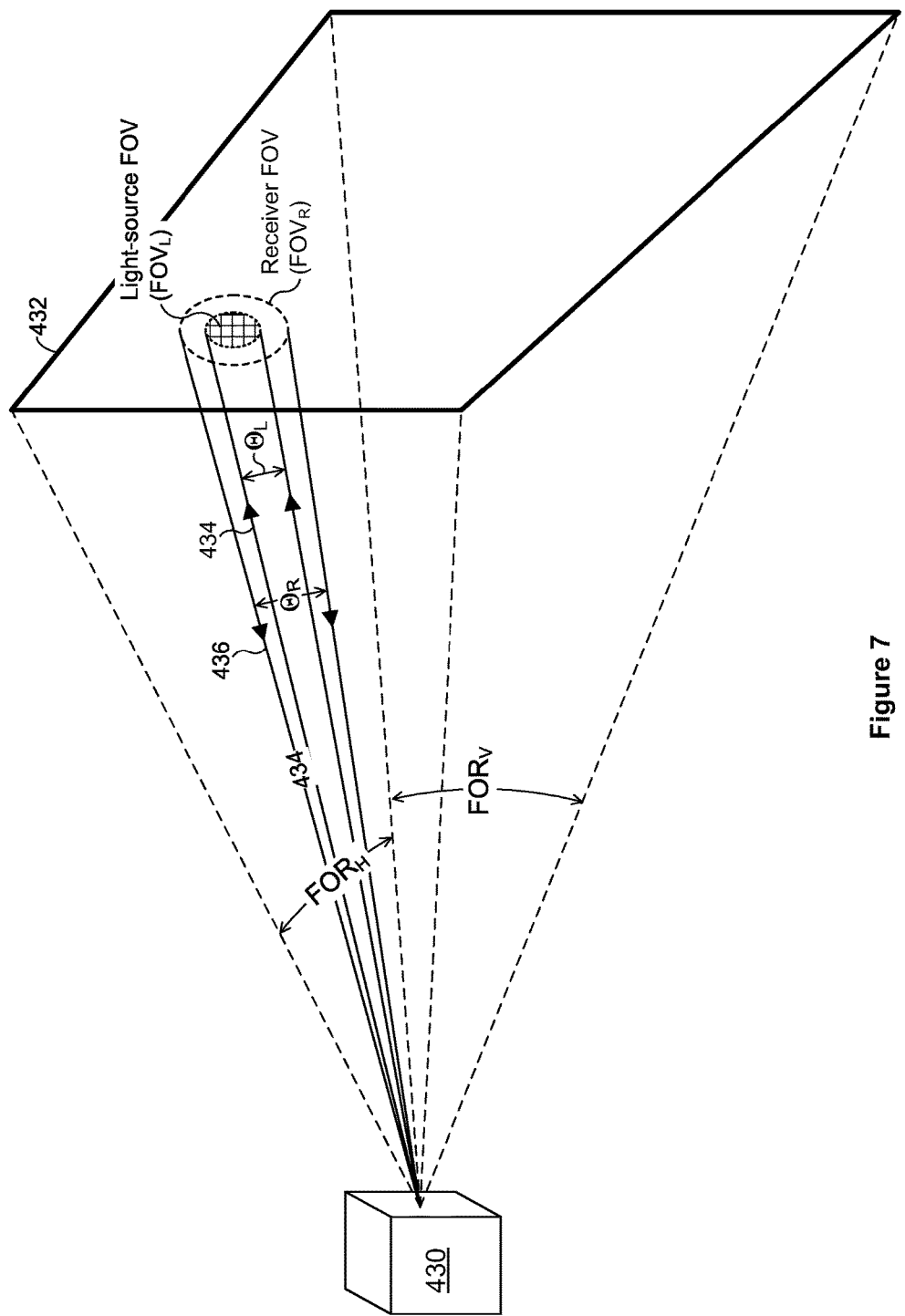
FIG. 7 schematically illustrates fields of view (FOVs) of a light source and a detector that can operate in the lidar systems of FIGS. 1A-4B.

For clarity, FIG. 7 illustrates an example light-source field of view ($FOV_L$) and receiver field of view ($FOV_R$) for the lidar system 100A-F. A light source 430 may emit pulses of light as the $FOV_L$ and $FOV_R$ are scanned by the scanner across a FOR 432. The light-source field of view may refer to an angular cone illuminated by the light source 430 at a particular instant of time. Similarly, a receiver field of view may refer to an angular cone over which the receiver of the lidar system may receive or detect light at a particular instant of time, and any light outside the receiver field of view may not be received or detected. For example, as the scanner scans the light-source field of view across a field of regard, the lidar system may send the pulse of light in the direction the $FOV_L$ is pointing at the time the light source 430 emits the pulse. The pulse of light may scatter off the target, and the receiver may receive and detect a portion of the scattered light that is directed along or contained within the $FOV_R$.

In some implementations, the scanner is configured to scan both a light-source field of view and a receiver field of view across a field of regard of the lidar system. The lidar system may emit and detect multiple pulses of light as the scanner scans the $FOV_L$ and $FOV_R$ across the field of regard while tracing out the scan pattern. The scanner in some implementations scans the light-source field of view and the receiver field of view synchronously with respect to one another. In this case, as the scanner scans $FOV_L$ across a scan pattern, the $FOV_R$ follows substantially the same path at the same scanning speed. Additionally, the $FOV_L$ and $FOV_R$ may maintain the same relative position to one another as the scanner scans $FOV_L$ and $FOV_R$ across the field of regard. For example, the $FOV_L$ may be substantially overlapped with or centered inside the $FOV_R$ (as illustrated in FIG. 7), and the scanner may maintain this relative positioning between $FOV_L$ and $FOV_R$ throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

The $FOV_L$ may have an angular size or extent $\Theta_L$ that is substantially the same as or that corresponds to the divergence of the output beam 434, and the $FOV_R$ may have an angular size or extent $\Theta_R$ that corresponds to an angle over which the receiver may receive and detect light. The receiver field of view may be any suitable size relative to the light-source field of view. For example, the receiver field of view may be smaller than, substantially the same size as, or larger than the angular extent of the light-source field of view. In some implementations, the light-source field of view has an angular extent of less than or equal to 50 milliradians, and the receiver field of view has an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. The light-source field of view and the receiver field of view may have approximately equal angular extents. As an example, $\Theta_L$ and $\Theta_R$ may both be approximately equal to 1 mrad, 2 mrad, or 3 mrad. In some implementations, the receiver field of view is larger than the light-source field of view, or the light-source field of view is larger than the receiver field of view. For example, $\Theta_L$ may be approximately equal to 1.5 mrad, and $\Theta_R$ may be approximately equal to 3 mrad.

A pixel may represent or correspond to a light-source field of view. As the output beam 434 propagates from the light source 430, the diameter of the output beam 436 (as well as the size of the corresponding pixel) may increase according to the beam divergence $\Theta_L$. As an example, if the output beam 434 has a $\Theta_L$ of 2 mrad, then at a distance of 100 m from the lidar system, the output beam 434 may have a size or diameter of approximately 20 cm, and a corresponding pixel may also have a corresponding size or diameter of approximately 20 cm. At a distance of 200 m from the lidar system, the output beam 434 and the corresponding pixel may each have a diameter of approximately 40 cm.

Distributing Beams in a Non-Uniform Manner

Figure 8:
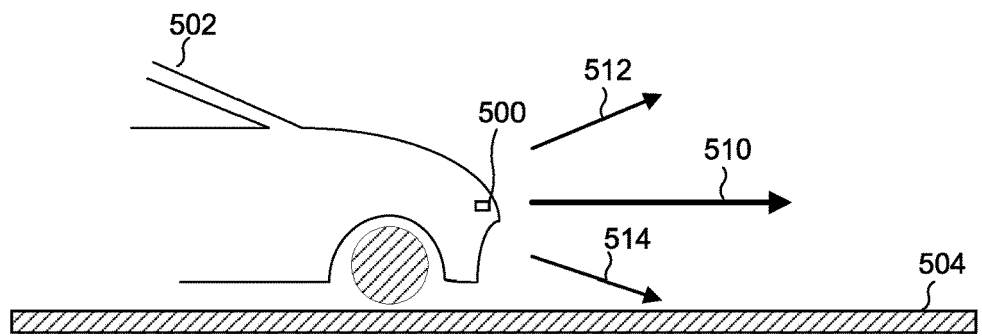
FIG. 8 schematically illustrates non-uniform beam power distribution in a vehicle in which the lidar system of this disclosure can operate.

FIG. 8 schematically illustrates that an example lidar system 500, implemented in a vehicle 502, produces non-uniform distribution of power across output beams. The lidar system 500 can be implemented similar to the lidar system 100A, 100B, 100C, 100D, 100E, or 100F discussed above. A beam 510 is directed substantially in parallel to the road surface defining the plane of motion 504. Beams 512 and 514 are angularly separated from the beam 510 by approximately 30 degrees in each direction. The beam 510 has more (e.g., 10%, 20%, 30% more) power than the beam 512 or the beam 514. The beams 512 and 514 in this example are angularly offset from the beam 510 by the same amount and have substantially the same amount of power. The lidar system 500 in various implementations and/or scenarios may generate these beams at the same time or at different times.

Thus, the lidar system 500 can vary the amount of power in output beams in accordance with the orientation of the output beams relative to the FOR of the lidar system 500. In some implementations, the geometric center of the FOR lies on the axis along which the vehicle 502 is traveling. In this manner, the lidar system 500 can direct more power along the direction of motion and direct less power in other directions. The lidar system 500 can thereby conserve energy and/or reduce the risk of output beams reflecting off of highly cooperative targets on the surface of the road resulting in return pulses with excessive energy (which may be damaging to the detectors).

The lidar system 500 in general need not distribute power symmetrically relative to the beam 510. For example, the lidar system 500 can reduce output power for the output beam 514 only, without reducing the output power for the output beam 512. Further, if the lidar system 500 generates N beams between the output beam 510 and the upper edge of the FOR, the lidar system 500 need not necessarily vary power between each pair of adjacent output beams. The lidar system 500 in some implementations can generate a smaller set of values to which the power of the N output beams is mapped, to define a set of several bands of beams. If each beam is used to only generate one respective scan line, the lidar system 500 effectively defines bands of two or more scan lines, where each band corresponds to a certain power level.

As indicated above, the lidar system 500 can use optical elements 122A-G to generate orientation-dependent distribution of power for output beams. The lidar system 500 in some implementations uses multiple seed lasers, each mechanically aimed at a different respective scan line (or a band of several adjacent scan lines within the vertical FOR), and amplify the pulses from these different seed lasers differently depending on the orientation of the corresponding output beams. The seed lasers can generate light at the same wavelength or different wavelengths. In other implementations, the lidar system utilizes a single laser at a certain wavelength and splits the output beam into several beams of non-equal power. The output beam can be split into beams having the same wavelength or different wavelengths.

Each of the optical elements 122A-G can include, for example, a passive optical element, an active optical element, a diffractive element, a holographic element, a thin-film filter, or a liquid crystal. In an example implementation, the optical element 122A-G includes a grating whose physical structure causes an incident monochromatic beam to split in a non-uniform manner across multiple angles.

Further, some implementations of the lidar system 500 can use fibers to split laser output in a non-uniform manner, and to this end can utilize Arrayed Waveguide Grating (AWG). For example, referring back to FIG. 3B, the laser-sensor links 252A and 252B can include optical fibers via which light source 250 transmits monochromatic light to the collimators 254A and 254B, respectively. The optical fibers in the laser-sensor links 252A and 252B can implement AWG components to split the monochromatic light into several output beams of different wavelength and different power (each of which then can be directed toward remote targets at a different respective angle by an optical element configured to respond differently to different wavelengths).

Figure 9:
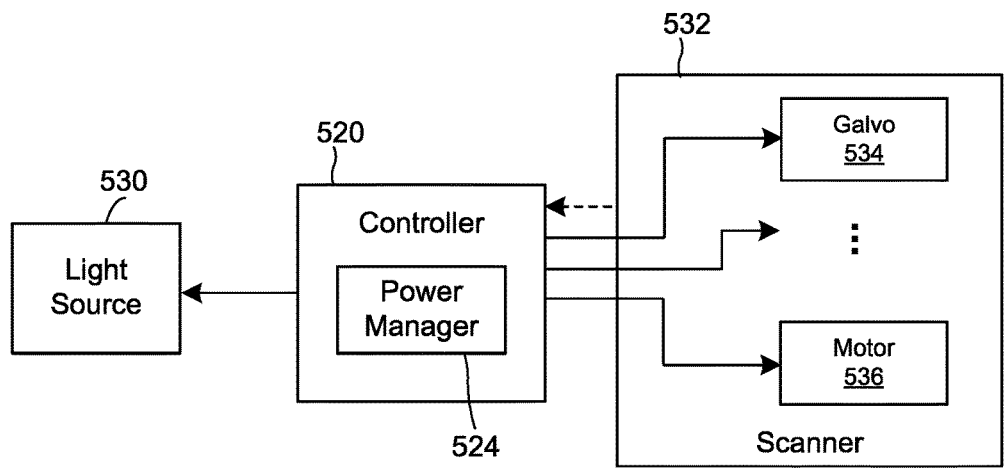
FIG. 9 is a block diagram of a system in which a controller controls a light source in view of the orientation of one or several mirrors, which can be implemented in at least some of the lidar systems of this disclosure.

In some implementations, a lidar system implements dynamic control of power of an output beam. Referring to FIG. 9, a controller 500 can implement a power manager 524 as a hardware component or, for example, a set of instructions stored on a computer-readable medium and executable by a processing unit. The controller 520 can provide positioning or drive signals to one or more galvanometer scanners 534 and/or a motor 536 (driving a polygon mirror, for example), determine the position current light-source FOV in view of these positioning or drive signals, and the power manager 524 can control the instantaneous power level of the light source 530 in accordance with the determined position of the light-source FOV, or the direction in which the light source 530 will transmit a pulse of light in response to a command from the power manager 524.

Alternatively, the lidar system can drive the galvanometer scanners and/or motors in an open-loop mode and use sensors such as photo-interrupter to determine the current position of one or more mirrors. The power manager 524 in this case can control the instantaneous power level of the light source 530 in accordance with sensor signals indicative to the operational states of the components 534, 536 rather than control signals provided to these components.

Figure 10:
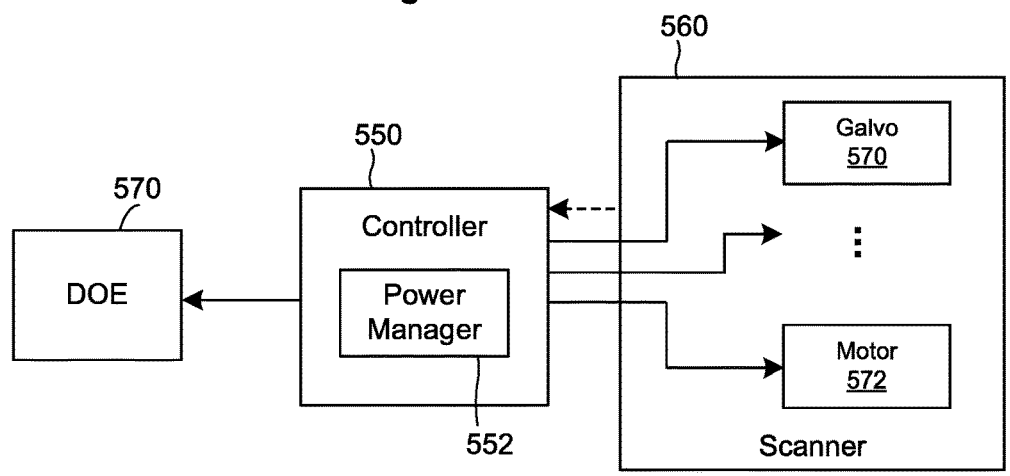
FIG. 10 is a block diagram of a system in which a controller controls an optical element in view of the orientation of one or several mirrors, which can be implemented in at least some of the implementations of the lidar system of this disclosure.

FIG. 10 illustrates another example implementation in which a controller 550 provides control signals to one or more galvanometer scanners 570, a motor 572, etc. and/or receives sensor signals from the scanner indicative of the current orientation of the corresponding mirrors, and electronically controls a spatial light modulator 570 in accordance with these signals. Some lidar systems can be configured so that a controller controls both a light source as illustrated in FIG. 9 and a spatial light modulator as illustrated in FIG. 10.

Figure 11:
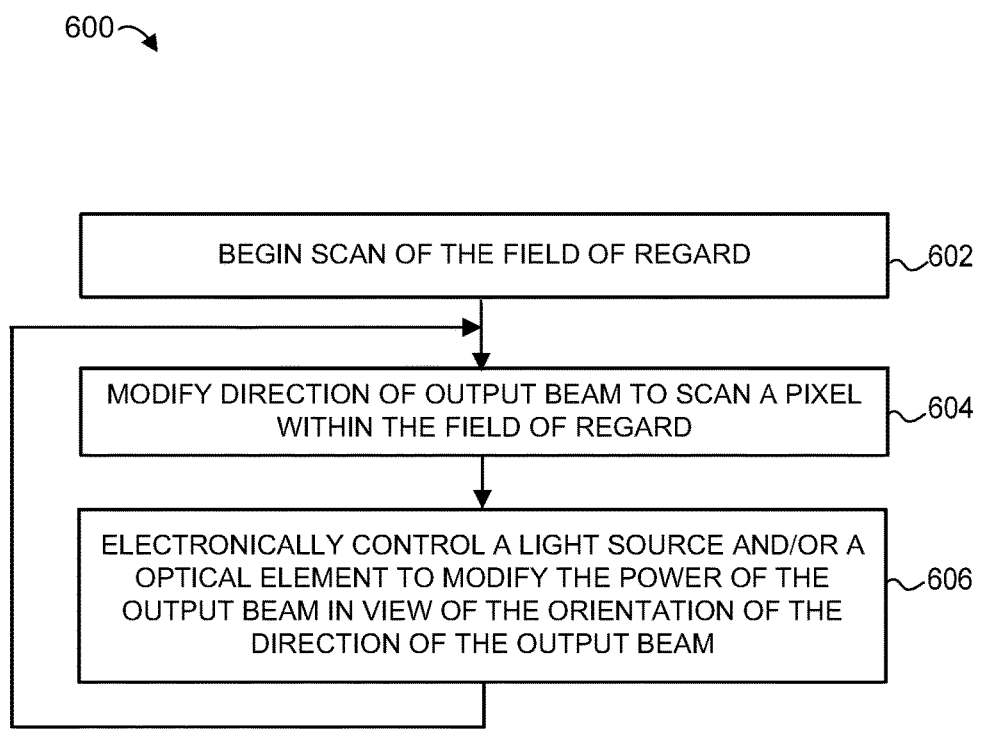
FIG. 11 is a flow diagram of an example method for controlling the power of an output beam in view of the orientation of the output beam relative to the field of regard, which can be implemented in at least some of the implementations of the lidar system of this disclosure.

Next, FIG. 11 illustrates an example method 600 that can be implemented in a controller of a lidar system, e.g., the controller 150 of FIGS. 1A and 1B, the controller 520 of FIG. 9, or the controller 550 of FIG. 10, for example. The method 600 can be implemented as a set of instructions stored on a non-transitory computer-readable medium and executable by one or more processing units.

The method 600 begins at block 602, where the scan of the field of regard begins. At block 604, the orientation of the output beam relative to the FOR is modified to scan a new pixel. To this end, the orientation of one or several mirrors can be adjusted. At block 606, a control signal can be provided to the light source and/or an electronically controllable optical element to vary the power of the output in accordance with the orientation set at block 604. The flow then returns to block 604.

Implementing a Lidar System in a Vehicle

As indicated above, one or more lidar systems 100A-F may be integrated into a vehicle. In one example implementation, multiple lidar systems may be integrated into a car to provide a complete 360-degree horizontal FOR around the car. As another example, 4-10 lidar systems, each system having a 45-degree to 90-degree horizontal FOR, may be combined together to form a sensing system that provides a point cloud covering a 360-degree horizontal FOR. The lidar systems may be oriented so that adjacent FORs have an amount of spatial or angular overlap to allow data from the multiple lidar systems to be combined or stitched together to form a single or continuous 360-degree point cloud. As an example, the FOR of each lidar system may have approximately 1-15 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

In some implementations, one or more lidar systems are included in a vehicle as part of an advanced driver assistance system (ADAS) to assist a driver of the vehicle in the driving process. For example, a lidar system may be part of an ADAS that provides information or feedback to a driver (e.g., to alert the driver to potential problems or hazards) or that automatically takes control of part of a vehicle (e.g., a braking system or a steering system) to avoid collisions or accidents. The lidar system may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In some cases, one or more lidar systems are integrated into a vehicle as part of an autonomous-vehicle driving system. In an example implementation, the lidar system 100A-F provides information about the surrounding environment to a driving system of an autonomous vehicle. An autonomous-vehicle driving system may include one or more computing systems that receive information from the lidar system about the surrounding environment, analyze the received information, and provide control signals to the vehicle's driving systems (e.g., steering wheel, accelerator, brake, or turn signal). For example, the lidar system integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets and their respective locations, distances, or speeds, and the autonomous-vehicle driving system may update control signals based on this information. As an example, if the lidar system detects a vehicle ahead that is slowing down or stopping, the autonomous-vehicle driving system may send instructions to release the accelerator and apply the brakes.

An autonomous vehicle may be referred to as an autonomous car, driverless car, self-driving car, robotic car, or unmanned vehicle. An autonomous vehicle may be a vehicle configured to sense its environment and navigate or drive with little or no human input. For example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

An autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In some implementations, a light source of a lidar system is located remotely from some of the other components of the lidar system such as the scanner and the receiver. Moreover, a lidar system implemented in a vehicle may include fewer light sources than scanners and receivers.

Figure 12:
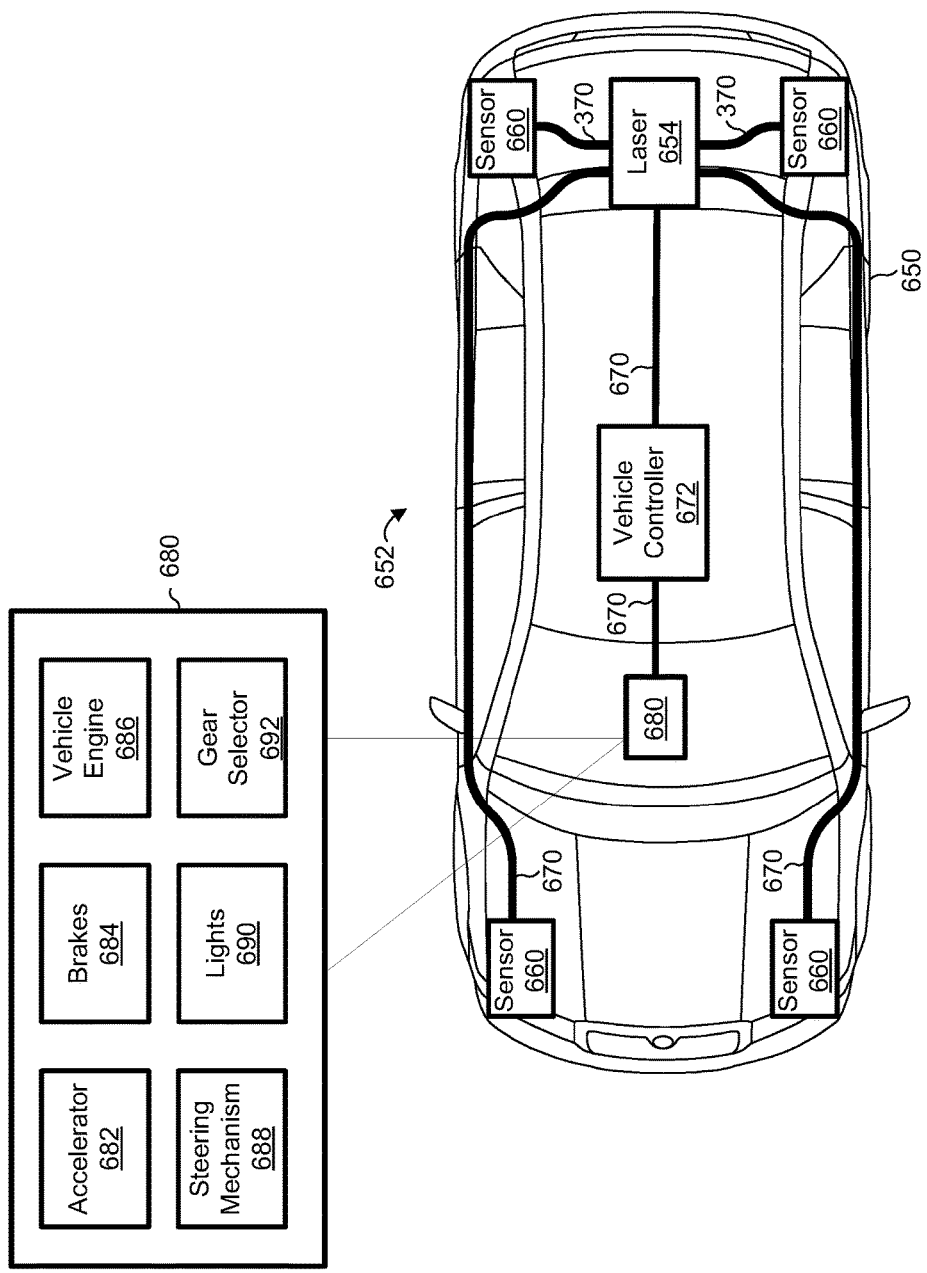
FIG. 12 is a block diagram of an example vehicle in which the lidar system of this disclosure can be implemented.

Next, FIG. 12 illustrates an example vehicle 650 with a lidar system 652 that includes a laser 654 with multiple sensor heads (or simply "sensors") 660 coupled to the laser 654 via multiple laser-sensor links 670. Each of the sensor heads 660 can implement at least several components of the lidar system 100A-F discussed above. Each of the laser-sensor links 670 may include one or more optical links and/or one or more electrical links. The sensor heads 660 in FIG. 12 are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads may be attached to or incorporated into a bumper, fender, grill, side panel, spoiler, roof, headlight assembly, taillight assembly, rear-view mirror assembly, hood, trunk, window, or any other suitable part of the vehicle.

In the example of FIG. 12, four sensor heads 660 are positioned at or near the four corners of the vehicle (e.g., the sensor heads may be incorporated into a light assembly, side panel, bumper, or fender), and the laser 654 may be located within the vehicle (e.g., in or near the trunk). The four sensor heads 660 may each provide a 90° to 120° horizontal field of regard (FOR), and the four sensor heads 660 may be oriented so that together they provide a complete 360-degree view around the vehicle. As another example, the lidar system 652 may include six sensor heads 660 positioned on or around a vehicle, where each of the sensor heads 660 provides a 60° to 90° horizontal FOR. As another example, the lidar system 652 may include eight sensor heads 360, and each of the sensor heads 660 may provide a 45° to 60° horizontal FOR. As yet another example, the lidar system 652 may include six sensor heads 660, where each of the sensor heads 660 provides a 70° horizontal FOR with an overlap between adjacent FORs of approximately 10°. As another example, the lidar system 652 may include two sensor heads 660 which together provide a forward-facing horizontal FOR of greater than or equal to 30°.

Data from each of the sensor heads 66—may be combined or stitched together to generate a point cloud that covers a greater than or equal to 30-degree horizontal view around a vehicle. For example, the laser 654 may include a controller or processor that receives data from each of the sensor heads 660 (e.g., via a corresponding electrical link 670) and processes the received data to construct a point cloud covering a 360-degree horizontal view around a vehicle or to determine distances to one or more targets. The point cloud or information from the point cloud may be provided to a vehicle controller 672 via a corresponding electrical, optical, or radio link 670. In some implementations, the point cloud is generated by combining data from each of the multiple sensor heads 660 at a controller included within the laser 654 and provided to the vehicle controller 672. In other implementations, each of the sensor heads 660 includes a controller or process that constructs a point cloud for a portion of the 360-degree horizontal view around the vehicle and provides the respective point cloud to the vehicle controller 672. The vehicle controller 62 then combines or stitches together the points clouds from the respective sensor heads 660 to construct a combined point cloud covering a 360-degree horizontal view. Still further, the vehicle controller 672 in some implementations communicates with a remote server to process point cloud data.

In any event, the vehicle 650 may be an autonomous vehicle where the vehicle controller 672 provides control signals to various components 680 within the vehicle 650 to maneuver and otherwise control operation of the vehicle 650. The components 680 are depicted in an expanded view in FIG. 12 for ease of illustration only. The components 680 may include an accelerator 682, brakes 684, a vehicle engine 686, a steering mechanism 688, lights 690 such as brake lights, head lights, reverse lights, emergency lights, etc., a gear selector 692, and/or other suitable components that effectuate and control movement of the vehicle 650. The gear selector 692 may include the park, reverse, neutral, drive gears, etc. Each of the components 680 may include an interface via which the component receives commands from the vehicle controller 672 such as "increase speed," "decrease speed," "turn left 5 degrees," "activate left turn signal," etc. and, in some cases, provides feedback to the vehicle controller 672.

In some implementations, the vehicle controller 672 receives point cloud data from the laser 564 or sensor heads 660 via the link 670 and analyzes the received point cloud data to sense or identify targets and their respective locations, distances, speeds, shapes, sizes, type of target (e.g., vehicle, human, tree, animal), etc. The vehicle controller 672 then provides control signals via the link 670 to the components 680 to control operation of the vehicle based on the analyzed information. For example, the vehicle controller 672 may identify an intersection based on the point cloud data and determine that the intersection is the appropriate location at which to make a left turn. Accordingly, the vehicle controller 672 may provide control signals to the steering mechanism 688, the accelerator 682, and brakes 684 for making a proper left turn. In another example, the vehicle controller 672 may identify a traffic light based on the point cloud data and determine that the vehicle 650 needs to come to a stop. As a result, the vehicle controller 672 may provide control signals to release the accelerator 682 and apply the brakes 684.

Example Receiver Implementation

Figure 13:
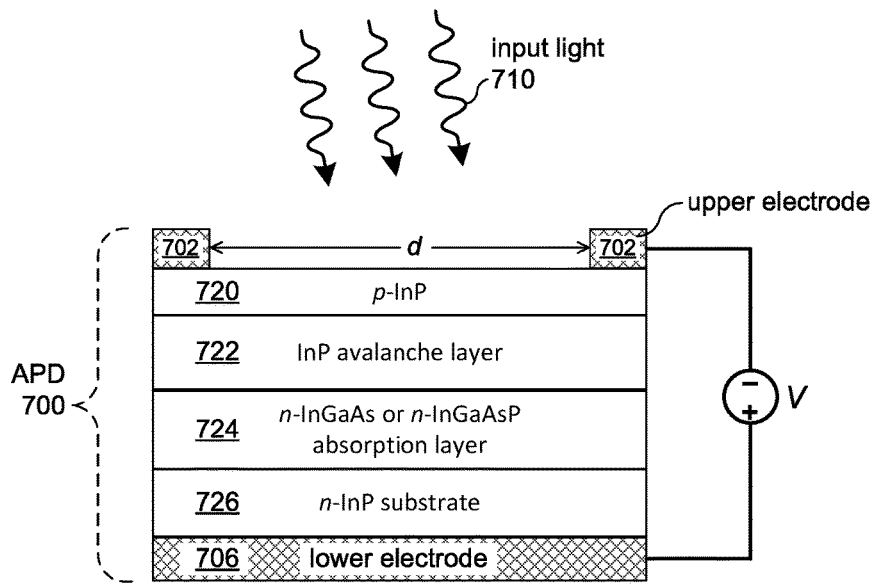
FIG. 13 illustrates an example InGaAs avalanche photodiode which can operate in the lidar system of this disclosure.

FIG. 13 illustrates an example InGaAs avalanche photodiode (APD) 700. For example, the receiver 140 (see FIG. 1A) or 164 (FIG. 1B) may include one or more APDs 700 configured to receive and detect light from input light. More generally, the APD 700 can operate in any suitable receiver of input light. The APD 700 may be configured to detect a portion of pulses of light which are scattered by a target located downrange from the lidar system in which the APD 700 operates. For example, the APD 700 may receive a portion of a pulse of light scattered by the target 130 depicted in FIG. 1A, and generate an electrical-current signal corresponding to the received pulse of light.

The APD 700 may include doped or undoped layers of any suitable semiconductor material, such as for example, silicon, germanium, InGaAs, InGaAsP, or indium phosphide (InP). Additionally, the APD 700 may include an upper electrode 702 and a lower electrode 706 for coupling the ADP 700 to an electrical circuit. The APD 700 400 for example may be electrically coupled to a voltage source that supplies a reverse-bias voltage V to the APD 700. Additionally, the APD 700 may be electrically coupled to a transimpedance amplifier which receives electrical current generated by the APD 700 and produces an output voltage signal that corresponds to the received current. The upper electrode 702 or lower electrode 706 may include any suitable electrically conductive material, such as for example a metal (e.g., gold, copper, silver, or aluminum), a transparent conductive oxide (e.g., indium tin oxide), a carbon-nanotube material, or polysilicon. In some implementations, the upper electrode 702 is partially transparent or has an opening to allow input light 710 to pass through to the active region of the APD 700. In FIG. 13, the upper electrode 702 may have a ring shape that at least partially surrounds the active region of the APD 700, where the active region refers to an area over which the APD 700 may receive and detect the input light 710. The active region may have any suitable size or diameter d, such as for example, a diameter of approximately 25 µm, 50 µm, 80 µm, 100 µm, 200 µm, 500 µm, 1 mm, 2 mm, or 5 mm.

The APD 700 may include any suitable combination of any suitable semiconductor layers having any suitable doping (e.g., n-doped, p-doped, or intrinsic undoped material). In the example of FIG. 13, the InGaAs APD 700 includes a p-doped InP layer 720, an InP avalanche layer 722, an absorption layer 724 with n-doped InGaAs or InGaAsP, and an n-doped InP substrate layer 726. Depending on the implementation, the APD 700 may include separate absorption and avalanche layers, or a single layer may act as both an absorption and avalanche region. The APD 700 may operate electrically as a PN diode or a PIN diode, and, during operation, the APD 700 may be reverse-biased with a positive voltage V applied to the lower electrode 706 with respect to the upper electrode 702. The applied reverse-bias voltage V may have any suitable value, such as for example approximately 5 V, 10 V, 20 V, 30 V, 50 V, 75 V, 100 V, or 200 V.

In FIG. 13, photons of the input light 710 may be absorbed primarily in the absorption layer 724, resulting in the generation of electron-hole pairs (which may be referred to as photo-generated carriers). For example, the absorption layer 724 may be configured to absorb photons corresponding to the operating wavelength of the lidar system 100A-F (e.g., any suitable wavelength between approximately 1400 nm and approximately 1600 nm). In the avalanche layer 722, an avalanche-multiplication process occurs where carriers (e.g., electrons or holes) generated in the absorption layer 724 collide with the semiconductor lattice of the absorption layer 724, and produce additional carriers through impact ionization. This avalanche process can repeat numerous times so that one photo-generated carrier may result in the generation of multiple carriers. As an example, a single photon absorbed in the absorption layer 724 may lead to the generation of approximately 10, 50, 100, 200, 500, 1000, 10,000, or any other suitable number of carriers through an avalanche-multiplication process. The carriers generated in an APD 700 may produce an electrical current that is coupled to an electrical circuit which may perform signal amplification, sampling, filtering, signal conditioning, analog-to-digital conversion, time-to-digital conversion, pulse detection, threshold detection, rising-edge detection, or falling-edge detection.

The number of carriers generated from a single photo-generated carrier may increase as the applied reverse bias V is increased. If the applied reverse bias V is increased above a particular value referred to as the APD breakdown voltage, then a single carrier can trigger a self-sustaining avalanche process (e.g., the output of the APD 400 is saturated regardless of the input light level). The APD 700 that is operated at or above a breakdown voltage may be referred to as a single-photon avalanche diode (SPAD) and may be referred to as operating in a Geiger mode or a photon-counting mode. The APD 700 that is operated below a breakdown voltage may be referred to as a linear APD, and the output current generated by the APD 400 may be sent to an amplifier circuit (e.g., a transimpedance amplifier). The receiver 140 (see FIG. 1A) may include an APD configured to operate as a SPAD and a quenching circuit configured to reduce a reverse-bias voltage applied to the SPAD when an avalanche event occurs in the SPAD. The APD 700 configured to operate as a SPAD may be coupled to an electronic quenching circuit that reduces the applied voltage V below the breakdown voltage when an avalanche-detection event occurs. Reducing the applied voltage may halt the avalanche process, and the applied reverse-bias voltage may then be re-set to await a subsequent avalanche event. Additionally, the APD 700 may be coupled to a circuit that generates an electrical output pulse or edge when an avalanche event occurs.

In some implementations, the APD 700 or the APD 700 along with transimpedance amplifier have a noise-equivalent power (NEP) that is less than or equal to 100 photons, 50 photons, 30 photons, 20 photons, or 10 photons. For example, the APD 700 may be operated as a SPAD and may have a NEP of less than or equal to 20 photons. As another example, the APD 700 may be coupled to a transimpedance amplifier that produces an output voltage signal with a NEP of less than or equal to 50 photons. The NEP of the APD 700 is a metric that quantifies the sensitivity of the APD 700 in terms of a minimum signal (or a minimum number of photons) that the APD 700 can detect. The NEP may correspond to an optical power (or to a number of photons) that results in a signal-to-noise ratio of 1, or the NEP may represent a threshold number of photons above which an optical signal may be detected. For example, if the APD 700 has a NEP of 20 photons, then the input beam with 20 photons may be detected with a signal-to-noise ratio of approximately 1 (e.g., the APD 700 may receive 20 photons from the input beam 710 and generate an electrical signal representing the input beam 710 that has a signal-to-noise ratio of approximately 1). Similarly, the input beam 710 with 100 photons may be detected with a signal-to-noise ratio of approximately 5. In some implementations, the lidar system 100A-F with the APD 700 (or a combination of the APD 700 and transimpedance amplifier) having a NEP of less than or equal to 100 photons, 50 photons, 30 photons, 20 photons, or 10 photons offers improved detection sensitivity with respect to a conventional lidar system that uses a PN or PIN photodiode. For example, an InGaAs PIN photodiode used in a conventional lidar system may have a NEP of approximately $10^4$ to $10^5$ photons, and the noise level in a lidar system with an InGaAs PIN photodiode may be $10^3$ to $10^4$ times greater than the noise level in a lidar system 100A with the InGaAs APD detector 400.

Referring back to FIG. 1A, an optical filter may be located in front of the receiver 140 and configured to transmit light at one or more operating wavelengths of the light source 110 and attenuate light at surrounding wavelengths. For example, an optical filter may be a free-space spectral filter located in front of an APD. This spectral filter may transmit light at the operating wavelength of the light source (e.g., between approximately 1530 nm and 1560 nm) and attenuate light outside that wavelength range. As a more specific example, light with wavelengths of approximately 400-1530 nm or 1560-2000 nm may be attenuated by any suitable amount, such as for example, by at least 5 dB, 10 dB, 20 dB, 30 dB, or 40 dB.

Figure 14:
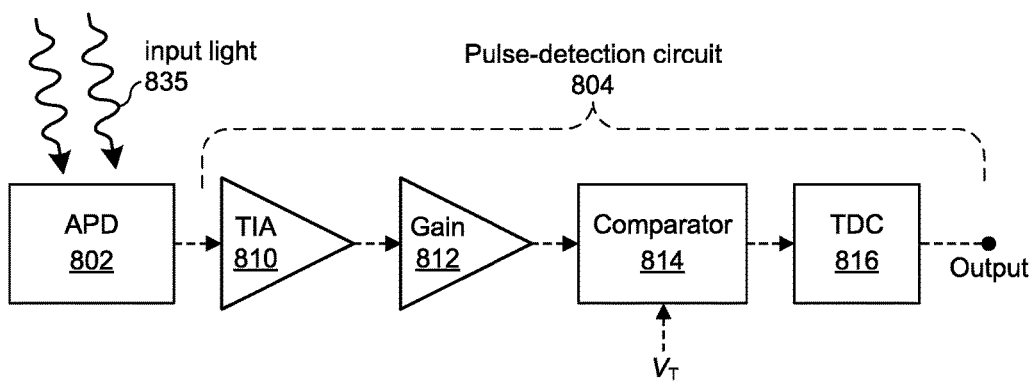
FIG. 14 illustrates an example photodiode coupled to a pulse-detection circuit, which can operate in the lidar system of this disclosure.

Next, FIG. 14 illustrates an APD 802 coupled to an example pulse-detection circuit 804. The APD 802 can be similar to the APD 700 discussed above with reference to FIG. 13, or can be any other suitable detector. The pulse-detection circuit 804 can operate in the lidar system of FIG. 1A as part of the receiver 140. Further, the pulse-detection circuit 804 can operate in the receiver 164 of FIG. 1B, or any other suitable receiver. The pulse-detection circuit 804 alternatively can be implemented in the controller 150 of FIG. 1A or another suitable controller. In some implementations, parts of the pulse-detection circuit 804 can operate in a receiver and other parts of the pulse-detection circuit 804 can operate in a controller. For example, components 810 and 812 may be a part of the receiver 140, and components 814 and 816 may be a part of the controller 150.

The pulse-detection circuit 804 may include circuitry that receives a signal from a detector (e.g., an electrical current from the APD 802) and performs current-to-voltage conversion, signal amplification, sampling, filtering, signal conditioning, analog-to-digital conversion, time-to-digital conversion, pulse detection, threshold detection, rising-edge detection, or falling-edge detection. The pulse-detection circuit 804 may determine whether an optical pulse has been received by the APD 802 or may determine a time associated with receipt of an optical pulse by the APD 802. Additionally, the pulse-detection circuit 804 may determine a duration of a received optical pulse. In an example implementation, the pulse-detection circuit 804 includes a transimpedance amplifier (TIA) 810, a gain circuit 812, a comparator 814, and a time-to-digital converter (TDC) 816.

The TIA 810 may be configured to receive an electrical-current signal from the APD 802 and produce a voltage signal that corresponds to the received electrical-current signal. For example, in response to a received optical pulse, the APD 802 may produce a current pulse corresponding to the optical pulse. The TIA 510 may receive the current pulse from the APD 802 and produce a voltage pulse that corresponds to the received current pulse. The TIA 810 may also act as an electronic filter. For example, the TIA 810 may be configured as a low-pass filter that removes or attenuates high-frequency electrical noise by attenuating signals above a particular frequency (e.g., above 1 MHz, 10 MHz, 20 MHz, 50 MHz, 100 MHz, 200 MHz, or any other suitable frequency).

The gain circuit 812 may be configured to amplify a voltage signal. As an example, the gain circuit 812 may include one or more voltage-amplification stages that amplify a voltage signal received from the TIA 810. For example, the gain circuit 812 may receive a voltage pulse from the TIA 810, and the gain circuit 812 may amplify the voltage pulse by any suitable amount, such as for example, by a gain of approximately 3 dB, 10 dB, 20 dB, 30 dB, 40 dB, or 50 dB. Additionally, the gain circuit 812 may also act as an electronic filter configured to remove or attenuate electrical noise.

The comparator 814 may be configured to receive a voltage signal from the TIA 810 or the gain circuit 812 and produce an electrical-edge signal (e.g., a rising edge or a falling edge) when the received voltage signal rises above or falls below a particular threshold voltage $V_T$. As an example, when a received voltage rises above $V_T$, the comparator 514 may produce a rising-edge digital-voltage signal (e.g., a signal that steps from approximately 0 V to approximately 2.5 V, 3.3 V, 5 V, or any other suitable digital-high level). As another example, when a received voltage falls below $V_T$, the comparator 814 may produce a falling-edge digital-voltage signal (e.g., a signal that steps down from approximately 2.5 V, 3.3 V, 5 V, or any other suitable digital-high level to approximately 0 V). The voltage signal received by the comparator 814 may be received from the TIA 810 or the gain circuit 812 and may correspond to an electrical-current signal generated by the APD 802. For example, the voltage signal received by the comparator 814 may include a voltage pulse that corresponds to an electrical-current pulse produced by the APD 802 in response to receiving an optical pulse. The voltage signal received by the comparator 814 may be an analog signal, and an electrical-edge signal produced by the comparator 814 may be a digital signal.

The time-to-digital converter (TDC) 816 may be configured to receive an electrical-edge signal from the comparator 814 and determine an interval of time between emission of a pulse of light by the light source and receipt of the electrical-edge signal. The output of the TDC 516 may be a numerical value that corresponds to the time interval determined by the TDC 816. In some implementations, the TDC 816 has an internal counter or clock with any suitable period, such as for example, 5 ps, 10 ps, 15 ps, 20 ps, 30 ps, 50 ps, 100 ps, 0.5 ns, 1 ns, 2 ns, 5 ns, or 10 ns. The TDC 816 for example may have an internal counter or clock with a 20 ps period, and the TDC 816 may determine that an interval of time between emission and receipt of a pulse is equal to 25,000 time periods, which corresponds to a time interval of approximately 0.5 microseconds. Referring back to FIG. 1A, the TDC 816 may send the numerical value "25000" to a processor or controller 150 of the lidar system 100A, which may include a processor configured to determine a distance from the lidar system 100A to the target 130 based at least in part on an interval of time determined by a TDC 816. The processor may receive a numerical value (e.g., "25000") from the TDC 816 and, based on the received value, the processor may determine the distance from the lidar system 100A to a target 130.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:
1. A lidar system comprising:
a light source configured to emit light;
an optical element configured to split the emitted light into a first output beam and a second output beam with an angular separation between the first output beam and the second output beam along a vertical dimension of a field of regard of the lidar system, wherein:
the first output beam includes a portion of the emitted light and has a first amount of power; and
the second output beam includes another portion of the emitted light and has a second amount of power different from the first amount of power;
a scanner configured to scan the field of regard of the lidar system using the first output beam and the second output beam; and a receiver configured to detect light associated with the first output beam and light associated with the second output beam scattered by one or more remote targets.

2. The lidar system of claim 1 operating in a vehicle, wherein:
the first output beam is directed in a direction substantially parallel to a plane of motion of the vehicle,
the second output beam is directed in a direction non-parallel to the plane of motion of the vehicle, and
the first output beam has more power than the second output beam.

3. The lidar system of claim 1, wherein the optical element is a diffractive optical element.

4. The lidar system of claim 1, wherein the optical element is disposed downrange of the scanner.

5. The lidar system of claim 1, wherein the scanner includes a mirror that distributes the emitted light along the vertical dimension of the field of regard to generate different respective scan lines for different orientations of the mirror relative to the field of regard, the lidar system further comprising a controller configured to (i) detect a current orientation of the mirror relative to the field of regard and (ii) cause the lidar system to vary either the first amount of power of the first output beam or the second amount of power of the second output beam in accordance with the current orientation of the mirror.

6. The lidar system of claim 1, wherein the optical element is disposed between the light source and the scanner.

7. The lidar system of claim 1, wherein the receiver includes:
a first detector to detect light associated with the first output beam, and
a second detector to detect light associated with the second output beam.

8. The lidar system of claim 1, wherein the scanner is configured to scan the first output beam horizontally across the field of regard, at a first fixed vertical offset relative to a centerline of the field of regard, to generate a first scan line including a first plurality of pixels, and scan the second output beam horizontally across the field of regard, at a second fixed vertical offset relative to the centerline of the field of regard, to generate a second scan line including a second plurality of pixels.

9. The lidar system of claim 5, wherein the controller is configured to electronically control the optical element to vary the first or second amount of power.

10. The lidar system of claim 1, wherein the first output beam and the second output beam are associated with a same wavelength.

11. The lidar system of claim 1, wherein the first output beam is associated with a first wavelength, and the second output beam is associated with a second wavelength.

12. The lidar system of claim 1 configured to vary the first amount of power of the first output beam in accordance with a current orientation of the first output beam relative to the field of regard along a horizontal dimension of the field of regard, and vary the second amount of power of the second output beam in accordance with a current orientation of the second output beam relative to the field of regard along the horizontal dimension of the field of regard.

13. The lidar system of claim 1, wherein the optical element is a holographic element.

14. The lidar system of claim 1, wherein the optical element is a thin-film filter deposited on an interior surface of a window of the lidar system.

15. The lidar system of claim 1, wherein the light source is a pulsed laser and the emitted light includes pulses of light having:
a wavelength between 1400 nm and 1600 nm;
a pulse duration between 1 ns and 100 ns; and
a pulse energy between 0.10 µJ and 10 µJ.

16. A method in a lidar system operating in a vehicle for scanning a field of regard, the method comprising:
emitting, by a light source of the lidar system, a beam of light;
splitting, by an optical element of the lidar system, the emitted light into a first output beam of light and a second output beam of light with an angular separation between the first output beam and the second output beam along a vertical dimension of the field of regard, wherein:
the first output beam includes a portion of the emitted light and has a first amount of power; and
the second output beam includes another portion of the emitted light and has a second amount of power smaller than the first amount of power;
scanning, by a scanner of the lidar system, the field of regard using the first output beam and the second output beam; and
detecting, by a receiver of the lidar system, light associated with the first output beam and light associated with the second output beam scattered by one or more remote targets.

17. The method of claim 16, further comprising:
varying the first amount of power of the first output beam in accordance with a current orientation of the first output beam relative to the field of regard along a horizontal dimension of the field of regard; and
varying the second amount of power of the second output beam in accordance with a current orientation of the second output beam relative to the field of regard along the horizontal dimension of the field of regard.

18. The method of claim 16, further comprising:
scanning the first output beam horizontally across the field of regard to generate a first scan line including a first plurality of pixels; and
scanning the second output beam horizontally across the field of regard to generate a second scan line including a second plurality of pixels.

19. The method of claim 16, wherein scanning the field of regard using the first output beam and the second output beam includes:
directing the first output beam of light in a direction substantially parallel to a plane of motion of the vehicle, and
directing the second output beam of light in a direction non-parallel to the plane of motion of the vehicle.

20. A lidar system operating in a vehicle moving on a plane of motion, the lidar system comprising:
a light source configured to emit light;
an optical element configured to split the emitted light into a plurality of output beams with nonequal power, angularly separated along a vertical dimension, the output beams including a first output beam and a second output beam;
a scanner configured to scan a field of regard of the lidar system using the plurality of output beams; and
a receiver configured to detect light associated with the plurality of output beams scattered by one or more remote targets, the receiver including:
a first detector to detect light associated with the first output beam, and a second detector to detect light associated with the second output beam.

21. The lidar system of claim 20, wherein the scanner is configured to scan the first output beam horizontally across the field of regard, at a first fixed vertical offset relative to a centerline of the field of regard, to generate a first scan line including a first plurality of pixels, and scan the second output beam horizontally across the field of regard, at a second fixed vertical offset relative to the centerline of the field of regard, to generate a second scan line including a second plurality of pixels.

22. The lidar system of claim 21, wherein the scanner is configured to scan the first output beam and the second output beam across a 360-degree field of regard.

23. The lidar system of claim 20, wherein the optical element is disposed downrange of the scanner.

24. The lidar system of claim 20, wherein the optical element is disposed between the light source and the scanner.

25. The lidar system of claim 20, wherein the scanner includes a first mirror that distributes the emitted light along a horizontal dimension of the field of regard and a second mirror that distributes the emitted light along the vertical dimension of the field of regard, wherein the optical element is disposed between the first mirror and the second mirror.

26. The lidar system of claim 20, wherein the first output beam and the second output beam are associated with a same wavelength.

27. The lidar system of claim 20, wherein the first output beam is associated with a first wavelength, and the second output beam is associated with a second wavelength.

28. The lidar system of claim 20, wherein the optical element is configured to split the emitted light so that:
- the first output beam has a first amount of power and is directed in a direction substantially parallel to the plane of motion of the vehicle; and
- the second output beam has a second amount of power smaller than the first amount of power and is directed in a direction non-parallel to the plane of motion of the vehicle.

* * * * *